United States Patent
Krichevsky et al.

(10) Patent No.: US 12,298,556 B2
(45) Date of Patent: May 13, 2025

(54) WIRE-BONDING METHODOLOGIES UTILIZING PREFORMED GLASS OPTICAL WIRES FOR MAKING CHIP-TO-CHIP OPTICAL INTERFACES

(71) Applicant: Intel Corporation, Santa Clara, CA (US)

(72) Inventors: Alexander Krichevsky, Cupertino, CA (US); Boping Xie, San Ramon, CA (US)

(73) Assignee: Intel Corporation, Santa Clara, CA (US)

( * ) Notice: Subject to any disclaimer, the term of this patent is extended or adjusted under 35 U.S.C. 154(b) by 741 days.

(21) Appl. No.: 17/352,098

(22) Filed: Jun. 18, 2021

(65) Prior Publication Data

US 2022/0404546 A1 Dec. 22, 2022

(51) Int. Cl.
*G02B 6/12* (2006.01)
*C03B 37/025* (2006.01)
*C03C 27/10* (2006.01)
*G02B 6/13* (2006.01)

(52) U.S. Cl.
CPC ........ *G02B 6/12004* (2013.01); *C03B 37/025* (2013.01); *C03C 27/10* (2013.01); *G02B 6/13* (2013.01); *G02B 2006/12038* (2013.01)

(58) Field of Classification Search
CPC .................. G02B 6/12004; G02B 6/13; G02B 2006/12038; G02B 6/3652; G02B 6/12; C03B 37/025; C03C 27/10
See application file for complete search history.

(56) References Cited

U.S. PATENT DOCUMENTS

| | | | |
|---|---|---|---|
| 2017/0254954 A1* | 9/2017 | Liu | G02B 6/30 |
| 2018/0017748 A1* | 1/2018 | Mir Shafiei | G02B 6/43 |
| 2023/0084003 A1* | 3/2023 | Taha | G02B 6/4214 385/31 |

OTHER PUBLICATIONS

Lindenmann, N. et al., "Photonic wire bonding: a novel concept for chip-scale interconnects", Optics Express, vol. 20, No. 16, Jul. 30, 2012, 11 pages.

* cited by examiner

*Primary Examiner* — Jennifer Doan
(74) *Attorney, Agent, or Firm* — Essential Patents Group, LLP

(57) ABSTRACT

A photonic integrated circuit (PIC) package comprising a first die, the first die comprising a first optical waveguide and a first trench extending from a first edge of the first die to the first optical waveguide. The first trench is aligned with the first optical waveguide. A second die comprises a second optical waveguide and a second trench extending from a second edge of the second die to the second optical waveguide. The second trench is aligned with the second optical waveguide. An optical wire comprising an uncladded glass fiber comprises a first terminal portion extending within the first trench and a second terminal portion extending within the second trench. The first terminal portion is aligned with the first optical waveguide and the second terminal portion is aligned with the second optical waveguide.

14 Claims, 18 Drawing Sheets

WIRE-BONDING METHODOLOGIES UTILIZING PREFORMED GLASS OPTICAL WIRES FOR MAKING CHIP-TO-CHIP OPTICAL INTERFACES

BACKGROUND

Optical communications have become the de-facto method of high-speed data transfers over long distances. Optical fibers have proven to have low losses over distances that are impossible for high speed electronic data transfers, while photonic data signals are not subject to distortion and electromagnetic interference. In addition, optical fiber cabling is less expensive than copper. Photonic integrated circuit (PIC) technologies are rapidly developing to fill a growing photonics market. Due to inadequate interfacing solutions for interconnecting separate PICs in the current market, large-scale integration of PICs is one avenue to combine multiple photonic functionalities on a single die. However, this approach may require highly complex integration of diverse materials and integrated circuit architectures that are better implemented on separate dies than on a single monolithic chip. Other approaches for chip-to-chip interfacing may incorporate bulky and expensive optical devices such as lens-based light coupling utilizing discrete optics, or direct butt coupling of optical fibers to integrated waveguides, requiring fine alignment between fiber and waveguide. The afore-mentioned solutions are not amenable to high-volume manufacture of PIC packaging. A breakthrough is needed to advance photonic device packaging that implements an integrated approach, and may employ standard semiconductor processing techniques to enable high-volume manufacturing of such devices.

DETAILED DESCRIPTION

Figure 1A:
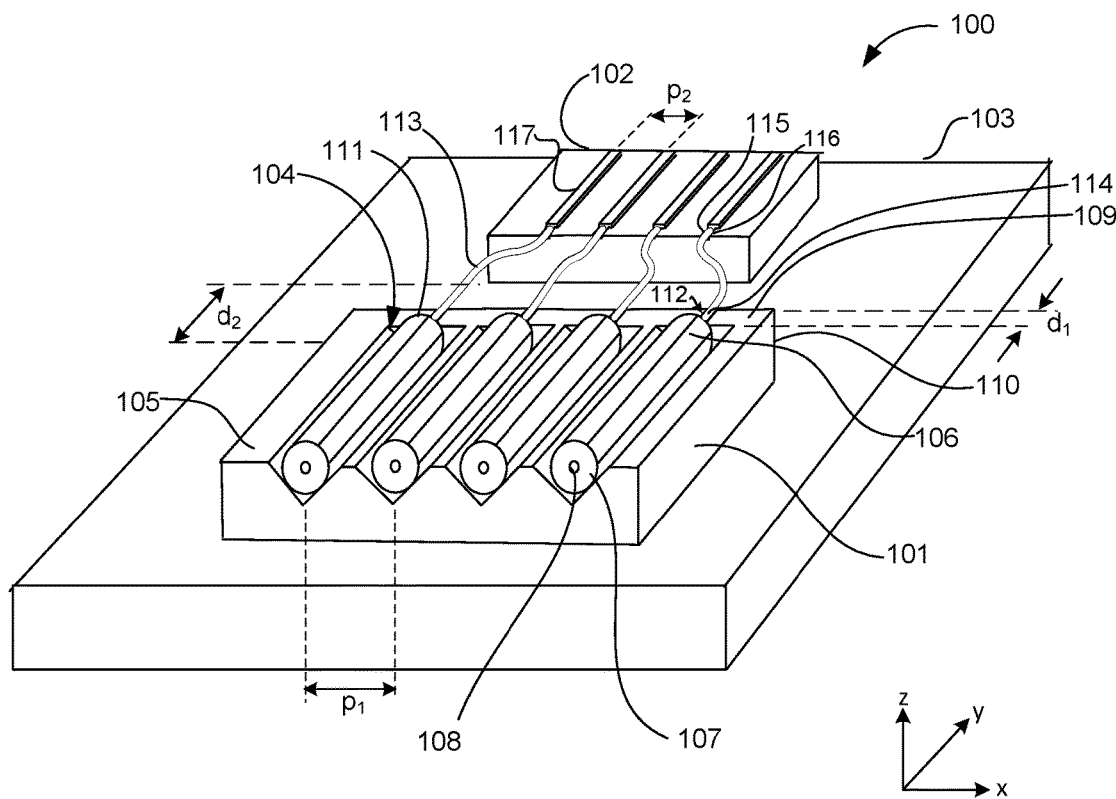
FIG. 1A illustrates an isometric view of an optoelectronic multi-chip package comprising two photonic integrated circuit (PIC) dies interconnected by a plurality of optical wires according to some embodiments of the disclosure.

Disclosed herein is a method of making optical interconnections between PIC chips in multi-chip packages utilizing pre-formed glass optical wire interconnects and wire-bonding methodologies. Exemplary embodiments of interconnected photonic integrated circuits (PICs) on separate chips are described below. Pre-formed and unclad optical wires may be produced from drawn silica glass and other drawn glassy fiber materials drawn into fine fibers. Wire bonding techniques may be utilized to attach pre-formed optical wires to PIC chips and interface them to photonic components such as optical fibers, integrated waveguides, optical gratings, lenses and the like. Optical wires may be freely suspended between interconnected chips, resembling wire-bonded gold wires in conventional microelectronic packages. In some embodiments, the optical wires are potted in an epoxy encapsulant.

In some embodiments, one or more lithographically-defined alignment trenches may be recessed in the surface of the PIC chip. The alignment trenches may extend from the edge of the PIC chip to a terminal facet of an optical waveguide, optical fiber, lens or other optical aperture. According to some embodiments, the cross section of the alignment trenches may be dimensioned to seat an attached segment of an optical wire during package assembly for accurate alignment with, for example, the optical axis of an integrated waveguide. As an example, the optical wire may be countersunk into the alignment trench. Such passive alignment may obviate more complicated and time-consuming active alignment of the optical wires and may enable rapid package assembly. The alignment trenches may be dimensioned in relation to the diameter of the optical wire, as described below.

Optical wires may be affixed to the alignment trench with an adhesive. According to some embodiments, a photo- or heat-curable adhesive (e.g., an epoxy) may be dispensed onto the alignment channel prior to placement of the optical wire into the alignment channel. In other embodiments, the optical wire may be pre-coated with a partially cured adhesive. In some embodiments, the adhesive may comprise a refractive index-matching composition. The index-matching adhesive may extend into a gap between the terminal facet of the optical wire and the optical component aperture.

Methods to make the optical wire interconnects may include techniques and equipment similar to conventional electrical wire bonding methods employed in package assembly. As an example, the optical wire may be a long continuous glass fiber that is spooled and fed to the package by a nozzle. A robotically controlled manipulation tool may grab the optical wire and place a first terminal portion of the optical wire within the alignment channel on one PIC chip and position the first aperture of the optical wire relative to the photonic component (e.g., a waveguide) to be coupled. In some embodiments, a pressing tool is employed to seat (e.g., by countersinking) the end portion of the optical wire into the alignment channel (e.g., a trench) to ensure accurate alignment. An external laser source may photocure or thermally cure any adhesive present, as described above. Alternatively, a polymeric coating may be present on the optical wire that may be thermoplastic or photosensitive and deformable by laser illumination at the time of seating of the optical wire in the alignment channel. The optical wire may be unspooled to stretch the optical wire over a second PIC chip, bridging a gap between the first and second PIC chips. The manipulation tool may be repositioned to grab the optical wire over the second PIC chip. Subsequently, the optical wire may be cleaved to form a second terminal aperture. The second terminal portion may be laid into the alignment channel of the second chip and aligned to the optical axis of a second photonic component (e.g., an optical fiber), and the attachment process repeated. The first and second photonic components on separate chips may be optically coupled through the optical wire bridging the distance between PIC chips.

In this disclosure, it is understood that the terms "over", "under", "above", "below", "upper", "lower", "top" and "bottom" have the usual structural meanings, referring to relative vertical positions within structural embodiments and to their immediate environment as viewed within the associated figures. Similarly, the terms "left", "right", "side" and "sideways" have the usual structural meanings, referring to relative horizontal positions within structural embodiments and within their immediate environment as viewed within the associated figures.

The terms "substantial" or "substantially" are used within this disclosure to mean "the greater part of", "mostly" or "mostly to fully". For example, "substantially" may qualitatively indicate a measure within 10% of a quantifiable attribute, with the possibility that the measure may range from 90% to 100% of the quantifiable attribute.

Views labeled "cross-sectional", "profile", "plan", and "isometric" correspond to orthogonal planes within a cartesian coordinate system. Thus, cross-sectional and profile views are taken in the x-z plane, plan views are taken in the x-y plane, and isometric views are taken in a 3-dimensional cartesian coordinate system (x-y-z). Where appropriate, drawings are labeled with axes to indicate the orientation of the figure.

FIG. 1A illustrates an isometric view of optoelectronic multi-chip package 100 comprising two PIC dies interconnected by a plurality of optical wires according to some embodiments of the disclosure.

Package 100 comprises PIC dies 101 and 102 attached to substrate 103. PIC die 101 comprises a plurality of grooves 104 (e.g., V-grooves) on surface 105 of PIC die 101. Grooves 104 may be formed by standardized etch techniques, for example, by a potassium hydroxide (KOH) etch of a silicon wafer exposing <111> planes at surface 105 to form a plurality of V-shaped grooves. A plurality of optical fibers 106 extend within each of the grooves 104, where the sloped walls of grooves 104 may mechanically stabilize optical fibers 106 by providing at least two lines of contact along the cylindrical bodies of optical fibers 106.

Optical fibers 106 may be single-mode or multi-mode fibers comprising a cladding 107 surrounding a core 108 extending at the center of optical fibers 106 along the optical axis of optical fibers 106. Cladding 107 may be significantly wider than core 108. For example, cladding 107 may be approximately 50 to 100 microns thick, whereas core 108 may have a diameter of 10 to 25 microns. The overall diameter of optical fibers 106 may be range between approximately 80 to 125 microns thick.

In some embodiments, optical fibers 106 may be abutted against ledge 109, extending a distance $d_1$ from edge 110 of PIC die 101 to terminal apertures 111 of optical fibers 106. Alignment trenches 112 (see FIG. 1B) are recessed within ledge 109, extending from edge 110 to terminal apertures 111. Optical wires 113 extend between PIC die 101 and PIC die 102 from alignment trenches 112 of PIC die 101, where first terminal portions 114 of optical wires 113 are seated. Optical wires 113 may terminate on PIC die 102, where a second terminal portion 115 of optical wires 113 are seated within alignment trenches 116 on PIC die 102, whereby optical wires 113 are countersunk within alignment trenches 116 by a portion of the average diameter of the optical wire ranging between 10% and 100% of the average diameter of the optical wire.

PIC die 102 comprises a plurality of optical waveguides 117 extending along PIC die 102. Optical waveguides 117 may be parallelly disposed as shown in FIG. 1A. In the illustrated embodiment, optical waveguides 117 are lithographically formed as ridges. PIC die 102 may comprise a substrate material comprising a layer of semiconductor material (e.g., silicon) over an insulating layer comprising, but not limited to, silicon oxides such as silicon dioxide (e.g., silica). The insulating layer is over a bulk semiconductor substrate. In some embodiments, the substrate material of PIC die 102 comprises a layer of silicon over a layer of silicon dioxide formed over a bulk silicon substrate (e.g., silicon-on-insulator, SOI). In some embodiments, optical waveguides 117 may have a silicon core encased in a silica cladding (shown in FIGS. 2A-B). In other embodiments, optical waveguides 117 may have cores comprising materials such as, but not limited to, silicon oxides, silicon nitride, silicon oxynitrides or silicon carbide. Such materials have refractive indices ranging between 1.5 and 3 and may be employed to form cores of integrated waveguides such as waveguides 117.

As an example, cores of optical waveguides 117 may be formed lithographically by etching the upper silicon layer of a SOI wafer, exposing the buried insulating layer below (e.g., a buried oxide, BOX). While silicon may be one choice of material for waveguide cores, other fabrication technologies may be employed such as removal of the silicon layer and lithographic formation of waveguides in the oxide layer of an SOI wafer. In other examples, silicon nitride or silicon carbide layers may be formed over silicon and waveguide cores lithographically etched therein. Cladding materials may comprise silicon oxides or ambient gases, such as air.

Waveguides 117 may also be formed as ridge waveguides having a rectangular cross section, according to some embodiments. In some embodiments, waveguides 117 may also have semicircular or a rounded cross section, generally depending on the type of etch employed to form waveguides 117 lithographically. As already noted, a layer of silica ($SiO_2$) may be deposited over the cores of higher refractive index to form a solid cladding. A silicon core may have a refractive index of 3.6-4.0, whereas the oxide cladding may have a refractive index of 1.5-2.0. In some embodiments, the cladding material is air (refractive index of 1), with no solid cladding layer covering cores, leaving them exposed. Such structures may be termed "uncladded" for the purposes of this disclosure.

The lateral and length dimensions of optical waveguides 117 may vary according to design and layout of other photonic components on board PIC die 102. For example, optical waveguides 117 may extend to and be coupled with optical isolators (not shown). Multiple optical waveguides 117 may have lateral pitches $p_2$ of 20-50 microns. This is contrasted to much larger lateral pitches $p_1$ for optical fibers 106 of up to 250 microns between cores of adjacent fibers. In the illustrated embodiment, additional waveguides 117 remain uncoupled to optical wires 113. This is to illustrate options in the configuration of the photonic components. For example, multiple lasers may be part of the photonic circuitry on PIC die 102, but four are coupled to PIC die 101 by optical wires 113 bridging the distance $d_2$ between dies.

Optical waveguides 117 may be single-mode or multi-mode waveguides. Large cross-sectional dimensions (e.g., 50-200 microns width and height) may enable multiple waveguide modes of light to propagate simultaneously along optical waveguides 117. Smaller cross sections (e.g., 10-25 microns) may accommodate single-mode light propagation. As an example, light to be carried by optical waveguides 117 (as well as optical wires 113 and optical fibers 106) is in the infrared (IR) or near-infrared (NIR) portion of the electromagnetic spectrum, covering wavelengths primarily ranging from 1200 nm to 1600 nm. Single-mode propagation is especially suitable for long-distance (e.g., >1 km) optical communications as it enables very small signal degradation and lower dispersion. Multi-mode propagation may have lower costs and more facile light coupling with larger numerical apertures (e.g., multimode fibers are used for shorter-range transmission, less than 1 km).

In some embodiments, optical wires 113 are obtained in a pre-formed state by a commercial process producing continuous glass fiber with precise diameters. Optical wires 113 may comprise a silicate-based glass, such as, but limited to boron-containing and boron-free E glass (E glass="electrical glass", a highly electrically insulating composition comprising a calcium alumino-borosilicate or aluminosilicate (boron-free) glass with less than 1% sodium oxide). In some embodiments, other types of silicate glasses, such as ECR glass (boron-free) and D glass (both boron-containing and boron-free), may be employed. The refractive indices of these glasses vary a small amount between glasses (e.g., 1.547 for boron-containing E glass and 1.56 for boron-free E glass. 1.4576 for ECR glass and 1.47 for D-glass). Young's moduli for the different glasses, important for bending and flexibility, also differ by small amounts (e.g., 76-78 gigapascals (GPa) for boron-containing E glass, 80-81 GPa for boron-free E glass as well as ECR and D glasses).

Optical wires 113 may be sized for single-mode propagation or multi-mode propagation. For example, optical wires 113 may have a diameter ranging between 5 microns and 20 microns (e.g., E glass is commercially available in diameters ranging from approximately 5 microns to approximately 24 microns). The smaller diameters may be suitable for single-mode propagation. In some embodiments, optical wires 113 are uncladded, whereby no external cladding layers of solid or liquid material clads optical wires 113 for the purposes of inducing total internal reflection of propagating light. With the exception of an adhesive coating for purposes of package assembly as described below, optical wires may be materially homogeneous within solid/gas boundaries.

Optical wires 113 may span the distance $d_2$ between PIC die 101 and PIC die 102 in a self-supported freely suspended state, as shown. The advantageous self-supporting property of optical wires 113 may be attributed to the relatively large Young's modulus of the E glass or other similar glasses described above, giving a sufficient stiffness to the fibers. Fiber stiffness is a function of the diameter (e.g., varies as the fourth power of the diameter), thus a 20 micron glass fiber may have a stiffness that is approximately 256 times greater than a 5 micron glass fiber of the same composition. Due to the relatively small diameters (generally less than 25 microns) of optical wires 113, there is a balance between flexibility and stiffness. Thus, facile manipulation of freely suspended optical wires 113 by micro tweezers or similar manipulation tools during assembly can enable direct coupling between optical components on separate chips that are spaced apart by any distance. Additionally, freely suspended optical wires 113 may be connected between multiple individual optical component in arrays having widely varying pitches. For example, the pitch $p_1$ between centers of optical fibers 106 on PIC die 101 may be approximately 250 microns to 500 microns, whereas the pitch $p_2$ between centers of optical waveguides 117 may be 25 microns. Additionally, the coupled photonic components may be at different z-heights (e.g., see FIG. 1F). Optical wires 113 enable facile chip-to-chip optical coupling between widely different chip architectures.

Figure 1B:
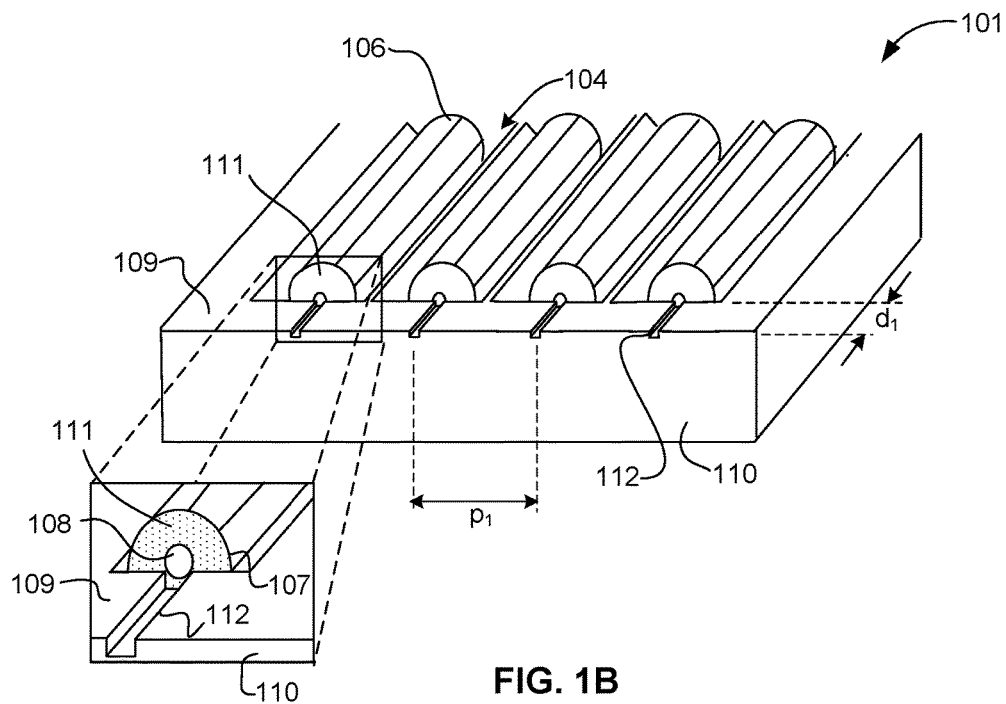
FIG. 1B illustrates an isometric view of a PIC die, according to some embodiments of the disclosure.

FIG. 1B illustrates an isometric view of PIC die 101, according to some embodiments of the disclosure.

FIG. 1B shows PIC die 101 looking into terminal apertures 111 along edge 110. Alignment trenches 112 are shown without optical wires 113 attached. The inset of FIG. 1B shows an enlarged view of a terminal apertures 111 of an optical wire 113, showing the position of an alignment trench 112 relative to core 108. Terminal aperture 111 of optical fiber 106 may be abutted against ledge 109 as shown. Alignment trench 112 may extend across ledge 109 between edge 110 and optical fiber 106, being aligned to core 108 in such a way that the optical axis of an optical wire 113 to be inserted in alignment trench 112 is substantially aligned with the optical axis of the optical fiber 106. The precision of the alignment may be enabled by adjustment of the cross-sectional dimensions of alignment trench 112 in relation to the diameter of optical wire 113, as described below.

Figure 1C:
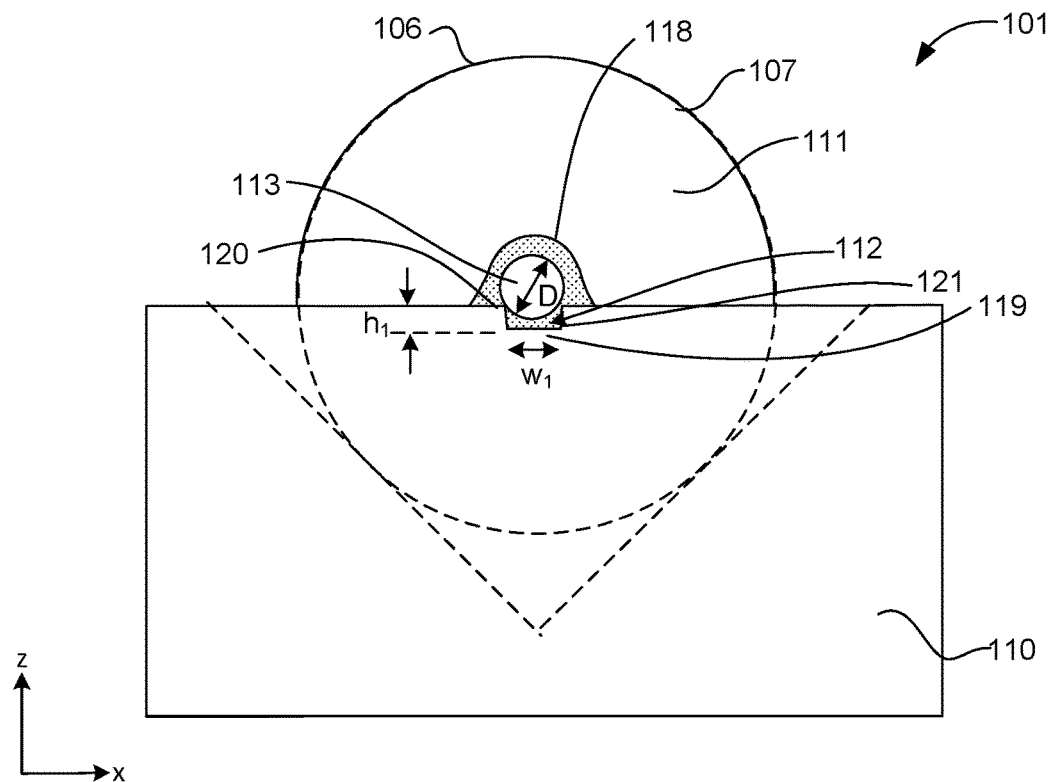
FIG. 1C illustrates a profile view of the PIC in the x-z plane, according to some embodiments of the disclosure.

FIG. 1C illustrates a profile view of PIC die 101 in the x-z plane, according to some embodiments of the disclosure.

The profile view of FIG. 1C shows optical wire 113 in cross section. Optical wire 113 is seated in alignment trench 112 and sealed with encapsulant 118. As shown in FIG. 1C, optical wire 113 may not fully insert into alignment trench 112 whereby optical wire 113 contacts bottom 119. In some embodiments, the cylindrical body of optical wire 113 is countersunk (e.g., inserted) into alignment trench 112 and may be supported by the two lines of contact along rails 120, formed at the junction of sidewalls 121 and ledge 109. Optical wire 113 may be sufficiently constrained from lateral motion by rails 120, enabling passive lateral centering of optical wire 113 at the optical axis of core 108 (not shown) that is accurately accomplished without active alignment. Another degree of freedom of optical wire 113 is removed by alignment trench 112, whereby optical wire 113 is constrained from moving downward (in the −z-direction), enabling passive vertical centering of optical wire 113 at the optical axis of optical fiber 106. In some embodiments, optical wire 113 may touch bottom 119, having three points of contact. In some embodiments, encapsulant 118 is an adhesive bonding optical wire 113 to alignment trench 112. An adhesive, such as, but not limited to an epoxy, may remove a fourth degree of freedom, constraining optical fiber 113 against upward vertical motion. In some embodiments, optical wire 113 is pre-coated with a thin layer of an adhesive (e.g., see FIG. 2C) that is activated upon contact, or by thermal or photo treatment.

In the illustrated embodiment, alignment trench 112 is shown to have a rectangular cross section. In some embodiments, alignment trench 112 may have a triangular cross-section (e.g., a V-groove) or a semi-circular cross section. Alignment trench 112 may generally have cross sectional dimensions depth $h_1$ and width $w_1$ that may be mathematically related to the diameter D of optical wire 113. The mathematical relationship, described below, may set the width $w_1$ of alignment trench for a given diameter D and trench depth $h_1$, or may set the depth $h_1$ for a given D and $w_1$. The countersunk depth of optical wire 113 may be adjusted to be less than $h_1$ to ensure two points of contact (e.g., along rails 120) for accurate alignment.

Figure 1D:
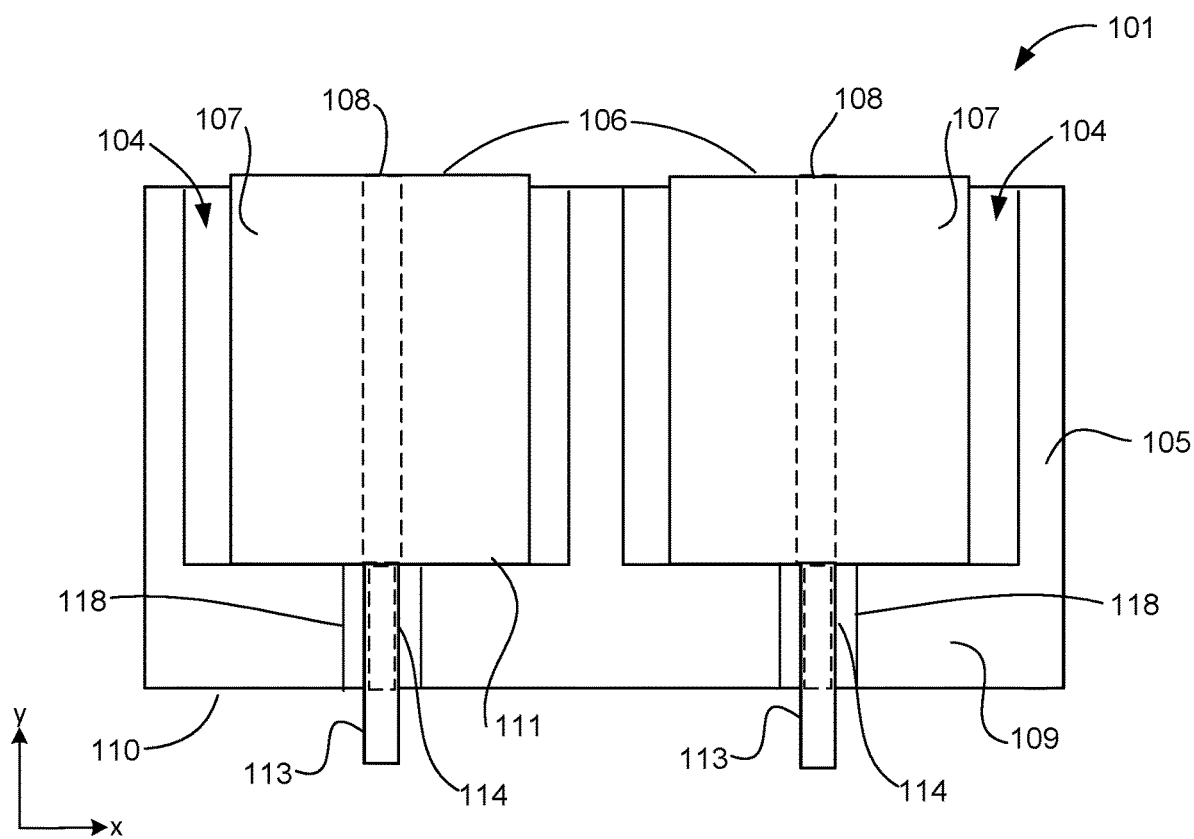
FIG. 1D illustrates a plan view of the PIC die in the x-y plane, according to some embodiments of the disclosure.

FIG. 1D illustrates a plan view of PIC die 101 in the x-y plane, according to some embodiments of the disclosure.

In FIG. 1D, two adjacent optical fibers 106 are shown from overhead seated within adjacent grooves 104 within surface 105. A pair of optical wires 113 are shown abutted against terminal apertures 111 of each optical fiber 106, aligned with cores (cores are indicated by hidden lines running down the center axis of optical fibers 106 within cladding 107). Optical wires 113 are seated within alignment trenches as shown in FIG. 1C (e.g., alignment trenches 112, indicated by the hidden lines below optical wires 113). Encapsulant 118, shown from overhead, covers optical wires 113 and seals them by adhesion to ledge 109 of PIC die 101 as shown in FIG. 1C. In the illustrated embodiment, encapsulant 118 is transparent or semi-transparent, allowing optical wires 113 to be viewed in the figure.

Figure 1E:
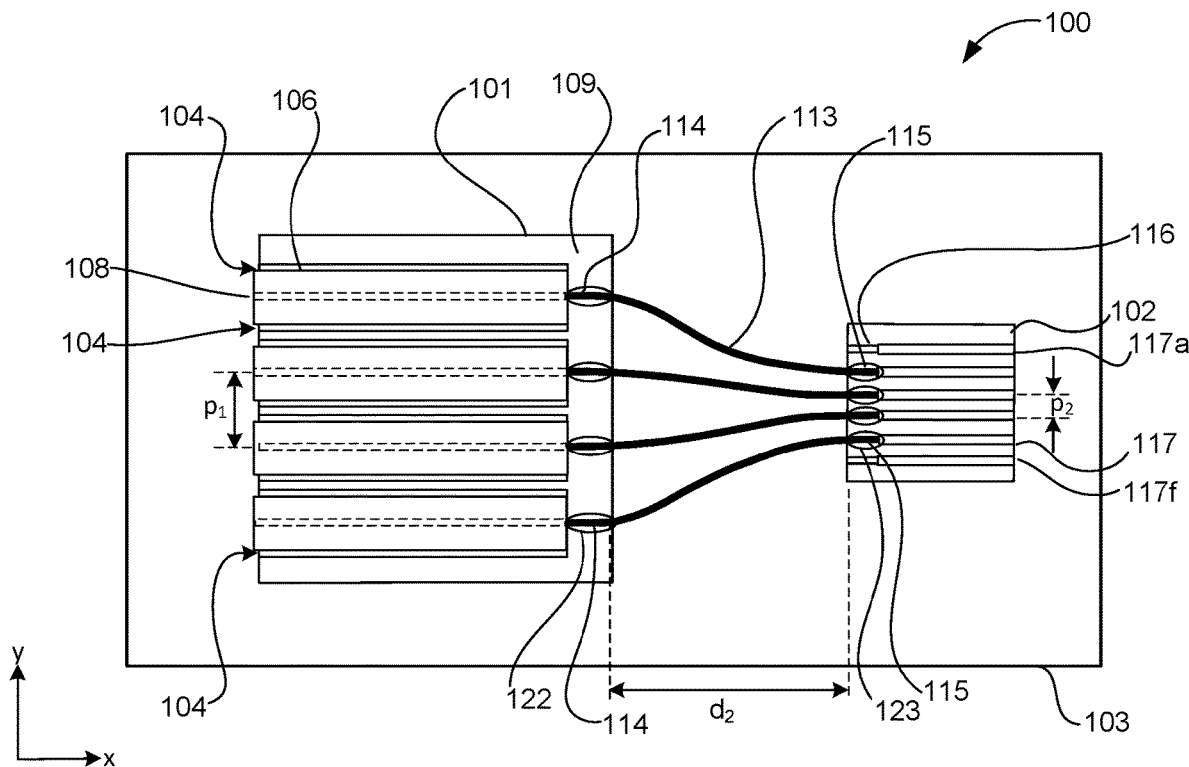
FIG. 1E illustrates a plan view in the x-y plane of the optoelectronic multi-chip package, according to some embodiments of the disclosure.

FIG. 1E illustrates a plan view in the x-y plane of optoelectronic multi-chip package 100, according to some embodiments of the disclosure.

The overhead view of FIG. 1E shows the bending of optical wires 113 in the x-y plane to conform to a reduction in pitch between $p_1$ of adjacent optical fibers 106 on PIC die 101 and $p_2$ of adjacent optical waveguides 117 on PIC die 102 (e.g., a reduction from $p_1$~250 microns to $p_2$~25 microns). Optical wires 113 span the distance $d_2$ between PIC die 101 and PIC die 102 unsupported. Distance $d_2$ may range between 0.5 mm and several mm. Optical wires 113 comprising glass fiber having average diameters ranging between 5 and 25 microns may have sufficient stiffness as a result of the large Young's modulus of the glass composition (e.g., ~80 GPa) to be self-supporting over relatively large distances.

In the illustrated embodiment, some waveguides on PIC die 102 are not coupled to optical wires 113. These uncoupled waveguides 117a and 117f may be redundant, or are coupled to non-functioning photonic components on PIC die 102 (not shown), and therefore not wired to optical fibers 106.

Terminal portions 114 and 115 of optical wires 113 are seated within alignment trenches (e.g., alignment trenches 112 and 116 below terminal portions 114 and 115, respectively). Alignment trenches 112 and 116 may mechanically constrain terminal portions 114 and 115, respectively, laterally and at least partially vertically, enabling self-alignment of terminal portions 114 and 115 with cores 108 of optical fibers 106 and cores (e.g., cores 203, FIG. 2A) of ridge waveguides 117. In some embodiments, adhesive beads 122 and 123 encapsulate terminal portions 114 and 115, respectively, sealing them to ledge 109 of PIC die 101, and to alignment trenches 112 and 116, respectively. Adhesive beads 122 and 123 may comprise a transparent (e.g., transparent at least to near-infrared (IR) and IR light) index-matching composition in an epoxy matrix, for example, to match refractive indices of optical wires 113 to cores 108 and ridge waveguides 117.

In some embodiments, optical wires 113 are pre-coated with a partially cured adhesive coating, or a coating of uncured epoxy or other suitable adhesive may be sprayed over optical wires 113 prior to assembly. Adhesive bumps 122 and 123 may be omitted in packages where pre-coated optical wires are employed as described below (e.g., see FIGS. 2B and 2C).

Figure 1F:
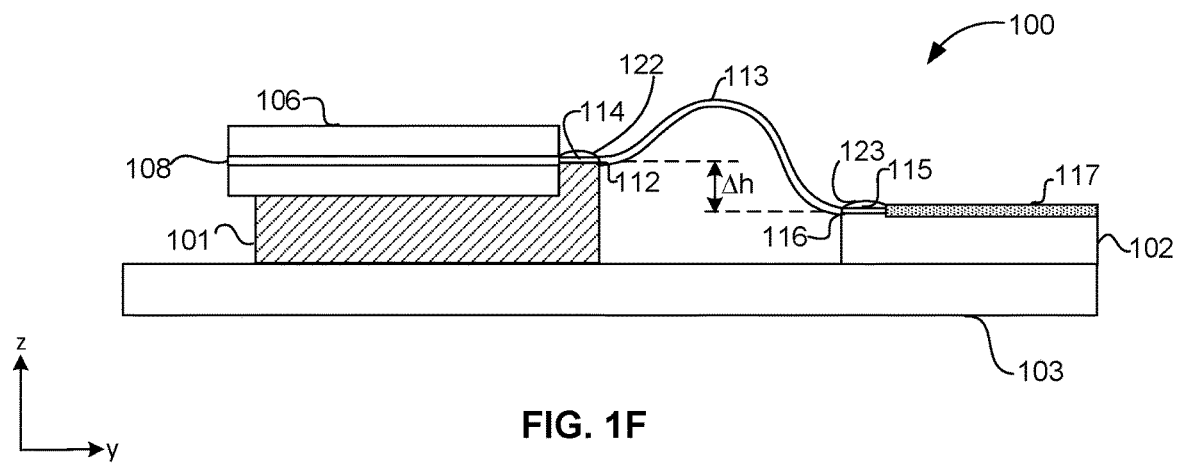
FIG. 1F illustrates a cross-sectional view in the y-z plane of the optoelectronic multi-chip package, according to some embodiments of the disclosure.

FIG. 1F illustrates a cross-sectional view in the y-z plane of package 100, according to some embodiments of the disclosure.

Optical wire 113 may be self-supporting over distance $d_2$ between PIC dies 101 and 102 as described above. Optical wire 113 may have bends to accommodate differences in pitch as shown in FIG. 1E, or differences in z-height such as $\Delta h$, as shown in FIG. 1F, between coupled optical components optical fiber 106 and ridge waveguide 117 on adjacent PIC dies 101 and 102, respectively.

Flexibility of optical wires 113 is advantageous for coupling diverse chips and chiplets that may be included within optoelectronic multi-chip packages. Inter-die coupling by optical wires 113 may enable incorporation of photonic dies comprising diverse materials and dimensions that may not have been possible employing conventional methods of inter-chip coupling.

Figure 2A:
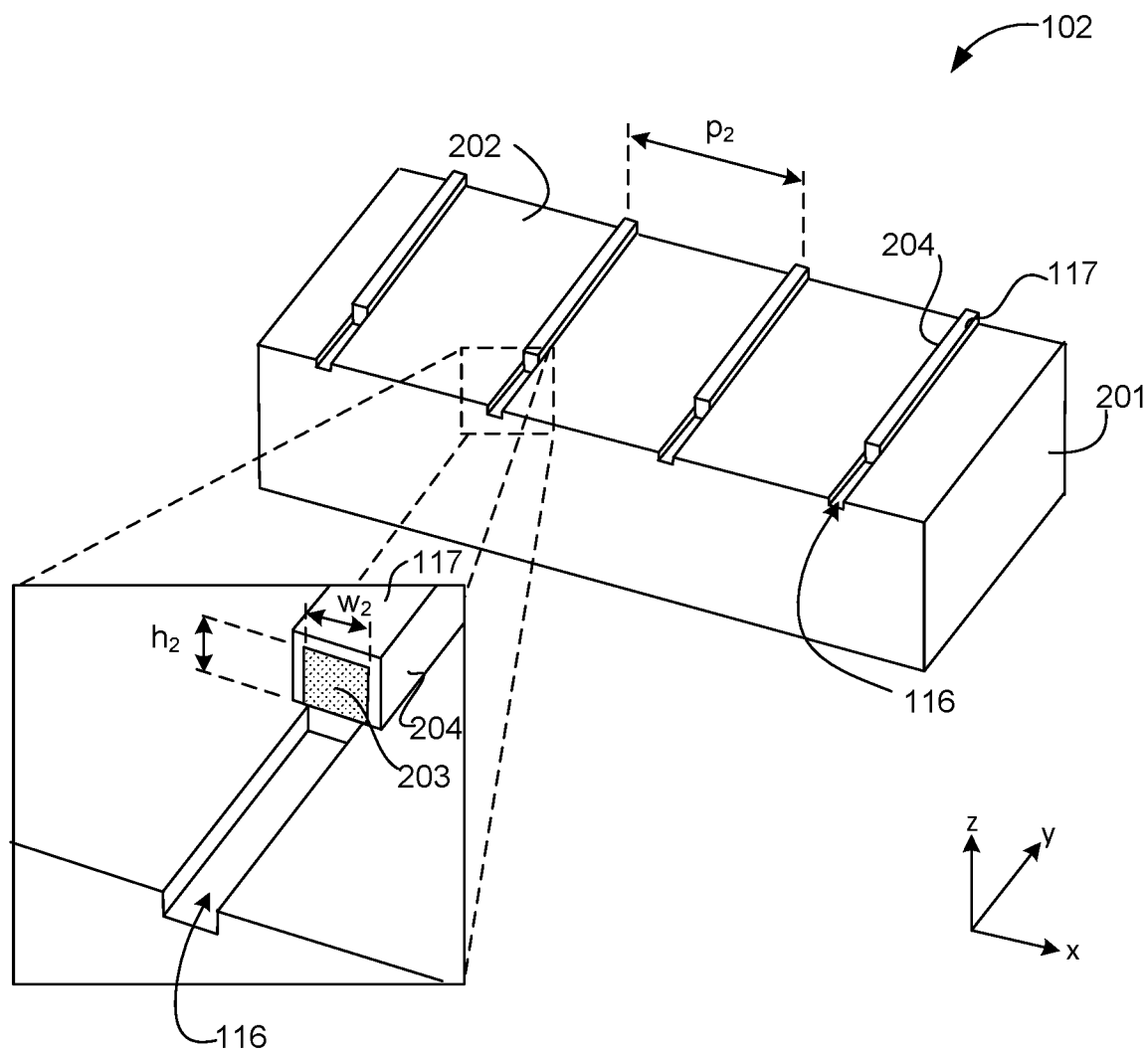
FIG. 2A illustrates an isometric view of the PIC die, according to some embodiments of the disclosure.

FIG. 2A illustrates an isometric view of PIC die 102, according to some embodiments of the disclosure.

PIC die 102, also shown in FIG. 1A, is shown without optical wire attachment. PIC die 102 comprises a plurality of optical waveguides 117 on substrate 201, arranged in an array having a pitch $p_2$, as shown in the illustrated embodiment. In some embodiments, pitch $p_2$ ranges between 20 and 50 microns. In the illustrated embodiment, optical waveguides 117 comprise cores 203 within cladding 204 as shown in the inset, extending from alignment trenches 116 along surface 202 of PIC die 102. In the illustrated embodiment, cores 203 are lithographically formed above surface 202, enabling butt coupling of optical wires (e.g., optical wires 113).

In some embodiments, cores 203 comprise silicon and are surrounded by cladding 204 comprising solid materials such as, but not limited to, silicon oxides (e.g., silicon dioxide).

Cores 203 may comprise silicon nitride or silicon oxynitride. In some embodiments, cladding 204 comprises silicon oxides such as silicon dioxide. In some embodiments, cladding 204 comprises a composite comprising an inorganic material and an organic material. In alternate embodiments, cladding 204 comprises the ambient atmosphere, such as, but not limited to, air, nitrogen, helium or argon. Cladding 204 may comprise a hybrid of solid and gaseous materials, such as a highly porous solid (e.g., a foam), whereby the effective refractive index of the cladding is between 1 and that of the solid material. The refractive index of the cladding material is generally lower than the refractive index of the cores for total internal reflection of the guided light waves within optical waveguides 117. Thus, a low index core may be employed if air or another ambient gas is employed as a cladding material, enabling a better match to the fiber core or a low numerical aperture for multi-mode propagation for optical waveguides 117.

As described above for PIC die 101 (see FIGS. 1A-1D), alignment trenches 116 may be similarly aligned with cores 203 substantially as described above, according to some embodiments. Optical waveguides may be single-mode or multi-mode waveguides having a low numerical aperture. In some embodiments, cores 203 have a rectangular cross section of width $w_2$ and a height $h_2$, which for example may be approximately 10 microns for each dimension. In some embodiments, optical waveguides are buried several microns below surface 202, with alignment trenches extending along the surface (e.g. surface 202) above buried waveguides, described below. As mentioned above, cladding 204 may comprise a solid material or comprise the surrounding ambient atmosphere (e.g., air).

Figure 2B:
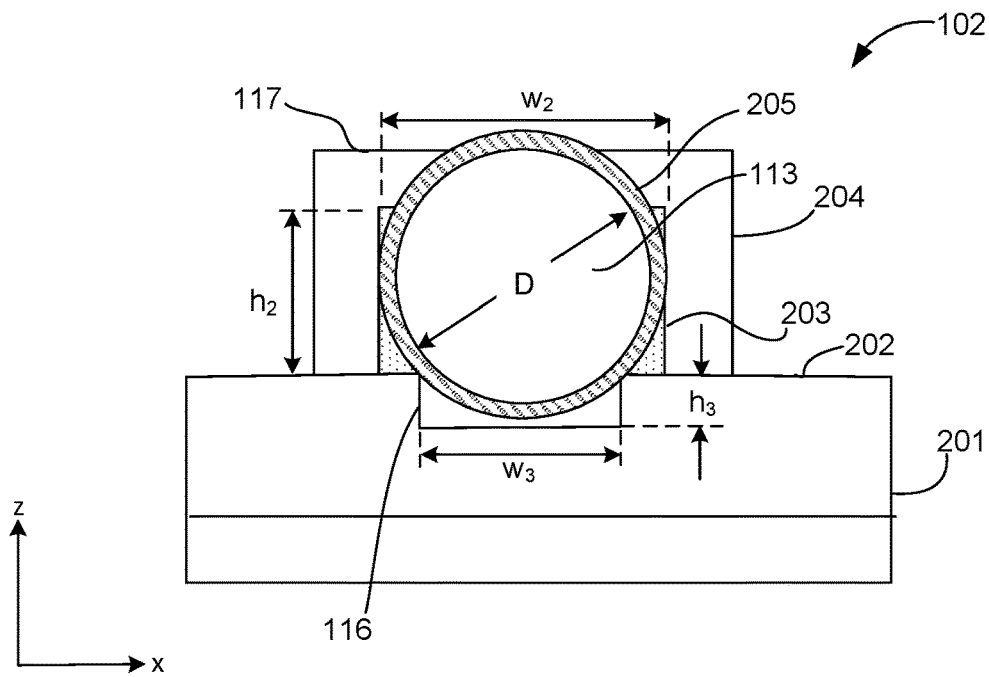
FIG. 2B illustrates a profile view in the x-z plane of the PIC die having an optical wire attached, according to some embodiments of the disclosure.

FIG. 2B illustrates a profile view in the x-z plane of PIC die 102 having optical wire 113 attached, according to some embodiments of the disclosure.

FIG. 2B shows a single optical waveguide 117 comprising core 203 surrounded by cladding 204. Optical wire 113 is seated within alignment trench 116 and abutted against core 203. In the illustrated embodiment, optical wire 113 is coated by a coating 205. In some embodiments, coating 205 comprises a partially-cured adhesive material. For example, when optical wire 113 is inserted into alignment trench 116, coating 205 may be photoactivated by a laser to finish the cure and cement optical wire 113 into alignment trench 116. In some embodiments, coating 205 may comprise a non-adhesive thermoplastic polymer that is deformable when heated or photolyzed. For example, coating 205 may be partially melted or softened by IR laser illumination, enabling optical wire 113 to seat within alignment trench 116 and self-align (pressure-assisted alignment in some embodiments) to core 203 of optical waveguide 117.

In the illustrated embodiment, alignment trench 116 is recessed below the level of surface 202. As explained above, optical wire 113 may be have a diameter D that is at least 80% of $w_2$, the largest cross-sectional dimension of the core aperture. In the illustrated embodiment, diameter D may be approximately $w_2$, the width of core 203, or width $w_2$ may range between 50% and 100% of D. As noted above, optical wire 113 is seated in alignment trench 116 such that optical wire 113 is countersunk by a portion of its diameter D, which is determined by width $w_3$ of alignment trench 116. As an example, width $w_3$ may be 80% or less of the diameter D. A maximum depth $h_3$ of alignment trench 116 may be 20% of the diameter D is necessary to mechanically constrain the optical wire.

Figure 2C:
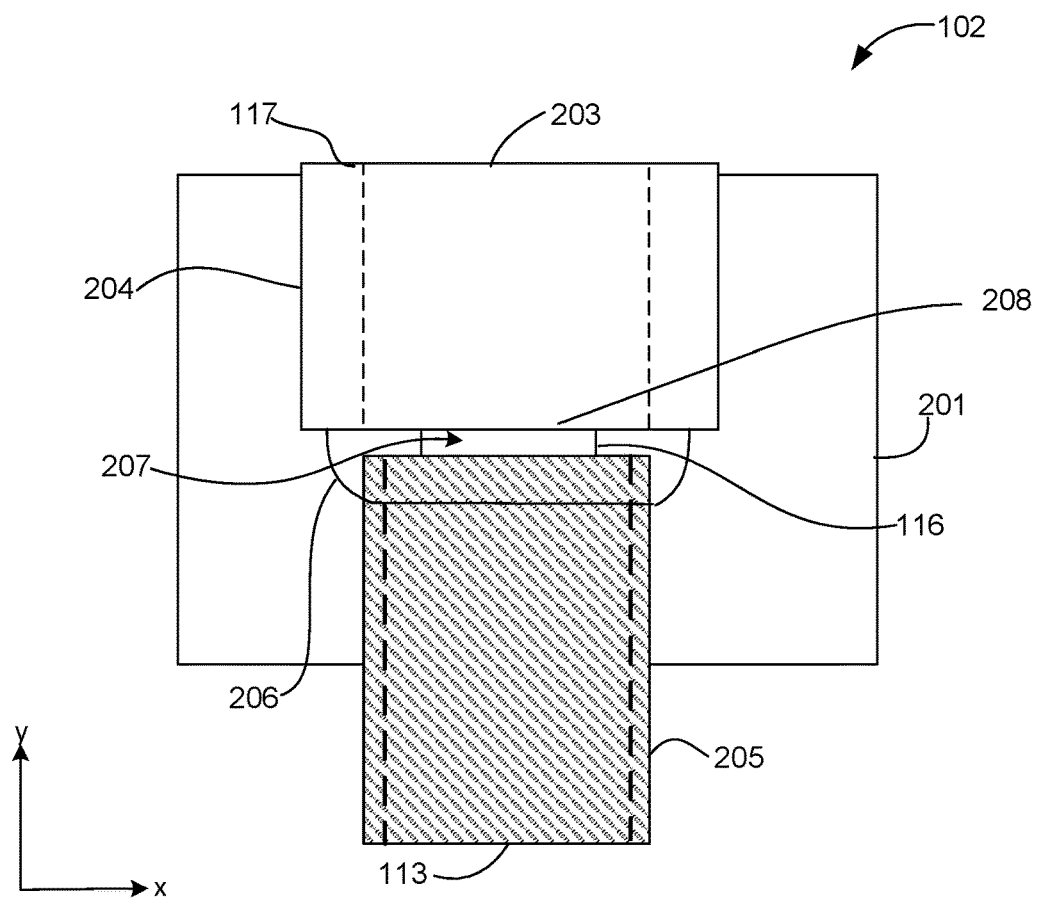
FIG. 2C illustrates a plan view in the x-y plane of the PIC die with an optical wire attached, according to some embodiments of the disclosure.

FIG. 2C illustrates a plan view in the x-y plane of PIC die 102 with optical wire 113 attached, according to some embodiments of the disclosure.

The overhead view of FIG. 2C shows an example of a butt-coupled optical wire 113 (with coating 205) that is seated within alignment trench 116, which is partially visible in the overhead view. Optical wire 113 is optically coupled to optical waveguide 117 through index-matching adhesive material 206. In the illustrated embodiment, index-matching adhesive material 206 may be an epoxy adhesive having an intermediate refractive index between optical fiber 113 and core 203. In some embodiments, optical wire may be offset by several microns from core 203 by gap 207, exposing a portion of alignment trench 116 between the end of optical wire 113 and the exposed facet 208 of core 203.

Figure 3A:
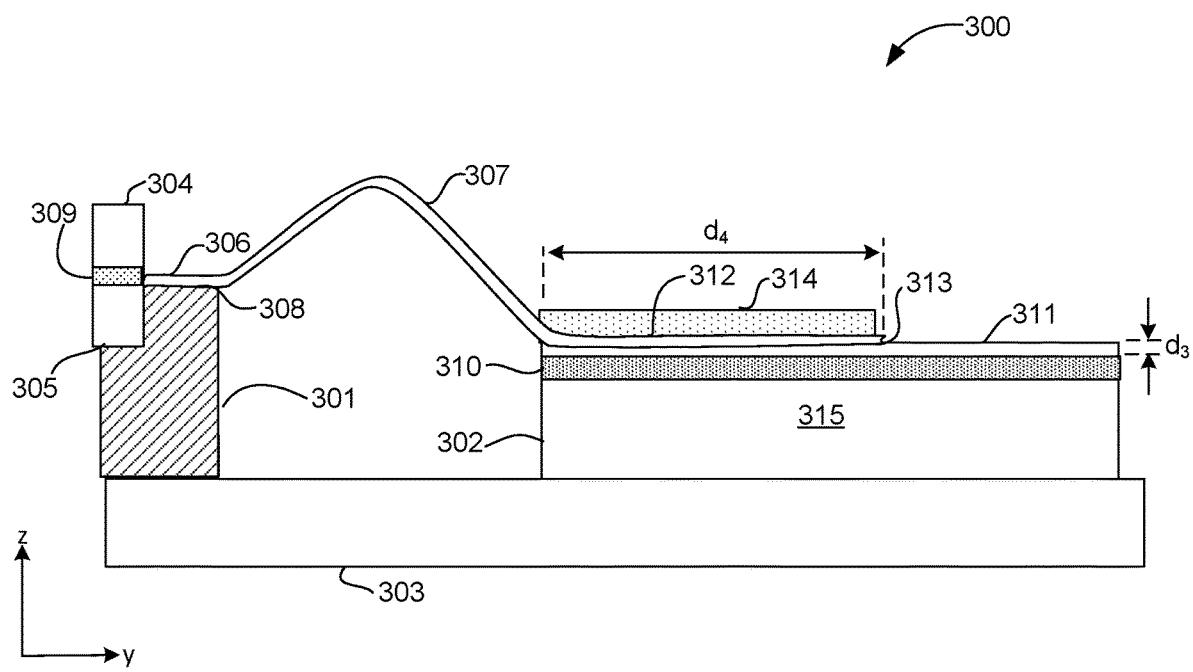
FIG. 3A illustrates a cross-sectional view in the y-z plane of an optoelectronic multi-chip package comprising evanescently coupled PIC dies, according to some embodiments of the disclosure.

FIG. 3A illustrates a cross-sectional view in the y-z plane of optoelectronic multi-chip package 300 comprising evanescently coupled PIC dies, according to some embodiments of the disclosure.

Package 300 comprises PIC die 301 and PIC die 302, both mounted on substrate 303. PIC die 301 comprises optical fiber 304 that is seated with groove 305. Terminal portion 306 of optical wire 307 is seated within alignment trench 308, positioning optical wire 307 to align with optical fiber core 309. As shown in the figure, optical wire 307 is freely suspended between PIC die 301 and 302, and may have random bends in any of the x, y and z planes as shown, giving optical wire 307 a three-dimensional structure. According to some embodiments, optical wire 307 conforms to pitch differences and z-height differences between coupled optical structures on separate chips, which may force bends in different planes along the length of optical wire 307 during attachment to PIC dies.

PIC die 302 comprises optical waveguide core 310 that is buried several microns below surface 311. Terminal portion 312 of optical wire 307 is engaged with PIC die 302 by alignment trench 313 recessed in surface 311 and may be centered over buried optical waveguide core 310. Terminal portion 312 of optical wire 307 may be substantially parallel with optical waveguide core 310. As the distance $d_3$ between surface 311 and optical waveguide core 310 may range between several hundred nanometers to several microns, light may be evanescently coupled between optical wire 307 and waveguide core 310. Overlap distance $d_4$ between optical wire 307 and waveguide core 310 may be adjusted for optimal coupling. As an example, $d_4$ may range between several tens of microns to several hundred microns, depending on size of PIC die 302 and coupling efficiency.

In some embodiments, alignment trench 313 is included to center terminal portion 312 over the optical axis of buried waveguide core 310 for maximum optical coupling between optical wire 307 and buried waveguide core 310. Thus, alignment trench may extend along surface 311 for at least several tens of microns to hundreds of microns, enabling terminal portion to seat within alignment trench 313 as described above. In the illustrated embodiment, an adhesive encapsulant 314 covers terminal portion 312, sealing terminal portion 312 into alignment trench 313 and to PIC die 302. In some embodiments, optical wire 307 or terminal portion 312 is coated with a coating (not shown, but may be similar to coating 205) that for example may be a partially-cured adhesive that is photo- or thermally curable at the time of package assembly. In some embodiments, encapsulant 314 comprises an index-matching component to match refractive indices of optical wire 307 to that of buried waveguide core 310.

In some embodiments, PIC die 302 comprises a silicon-on-insulator (SOI) substrate, where buried waveguide core 310 comprises silicon over a layer of silicon dioxide, whereby the silicon layer has been lithographically patterned into an array of waveguide cores 310 over the oxide layer. Cladding may comprise an epilayer of deposited silicon oxide covering top and sidewalls of waveguide cores 310. In some embodiments, buried waveguide core 310 comprises lower index material (e.g., n lower than 3), such as silicon nitride or silicon oxides).

Figure 3B:
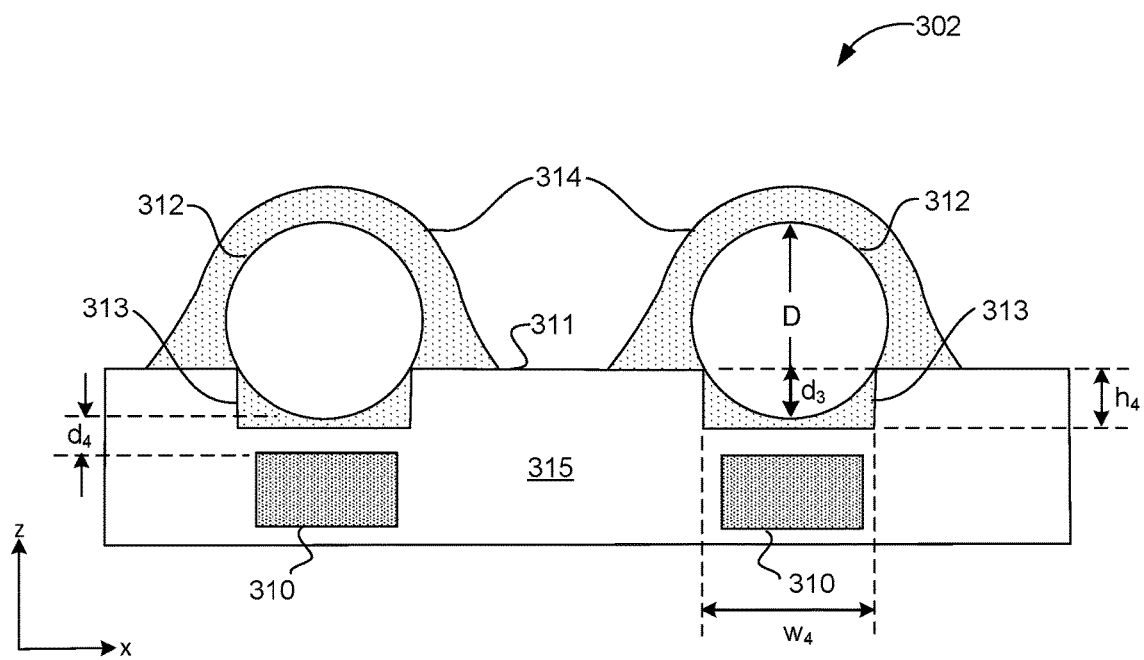
FIG. 3B illustrates a cross-sectional view in the x-z plane of a PIC die, according to some embodiments of the disclosure.

FIG. 3B illustrates a cross-sectional view in the x-z plane of PIC die 302, according to some embodiments of the disclosure.

PIC die 302 is shown having multiple adjacent buried waveguide cores 310 extending along the y-direction in the figure. As an example, adjacent buried waveguides may be part of a waveguide array. While buried waveguide cores 310 have a rectangular cross section, other suitable shapes may be considered. Alignment trenches 313 are recessed within cladding material 315 below surface 311 by depth $h_4$, which may be related to diameter D of optical wires 307. Terminal portions 312 of optical wires 307 are seated within alignment trenches and countersunk by a portion $d_3$ of their diameters (e.g., diameter D) that is related to widths $w_4$ of alignment trenches 313, as described above. A minimal distance $d_4$ between terminal portions 312 of optical wires 307 and buried waveguide cores 310 may be adjusted for optimal evanescent coupling of light. It is noted that PIC die 302 may have redundant waveguides that are not coupled to an optical wire.

Figure 3C:
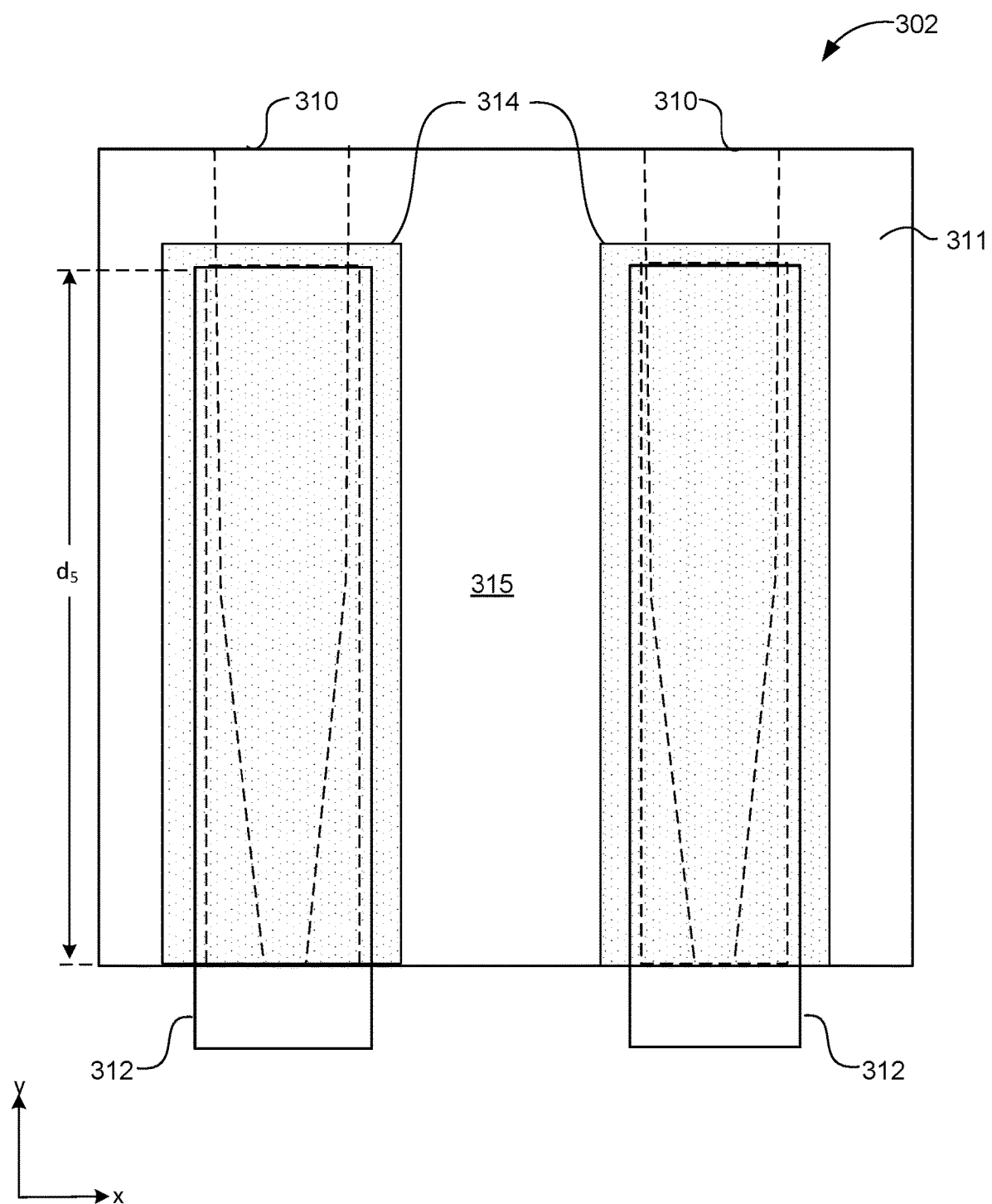
FIG. 3C illustrates a plan view in the x-y plane of the PIC die, according to some embodiments of the disclosure.

FIG. 3C illustrates a plan view in the x-y plane of PIC die 302, according to some embodiments of the disclosure.

Buried waveguides 310 are indicated by hidden lines below terminal portions 312 within cladding material 315. In the illustrated embodiment, buried waveguide cores 310 have a tapered width that may be advantageous, for example, to cause the propagated mode to expand when launching into the waveguide and therefore facilitate light coupling. Terminal portions 312 may extend a distance $d_5$ along buried waveguide cores 310, which may be tens to hundreds of microns, depending on coupling efficiency and size of PIC die 302. Encapsulant 314, serving as an adhesive and/or as an index matching medium, may be optionally omitted and replaced by a polymeric coating on terminal portions 312 as described above (e.g., similar to coating 205).

Cladding material 315 may comprise a deposited (silicon) oxide layer at surface 311 that extends to a silicon dioxide layer below waveguide cores 310.

Figure 4:
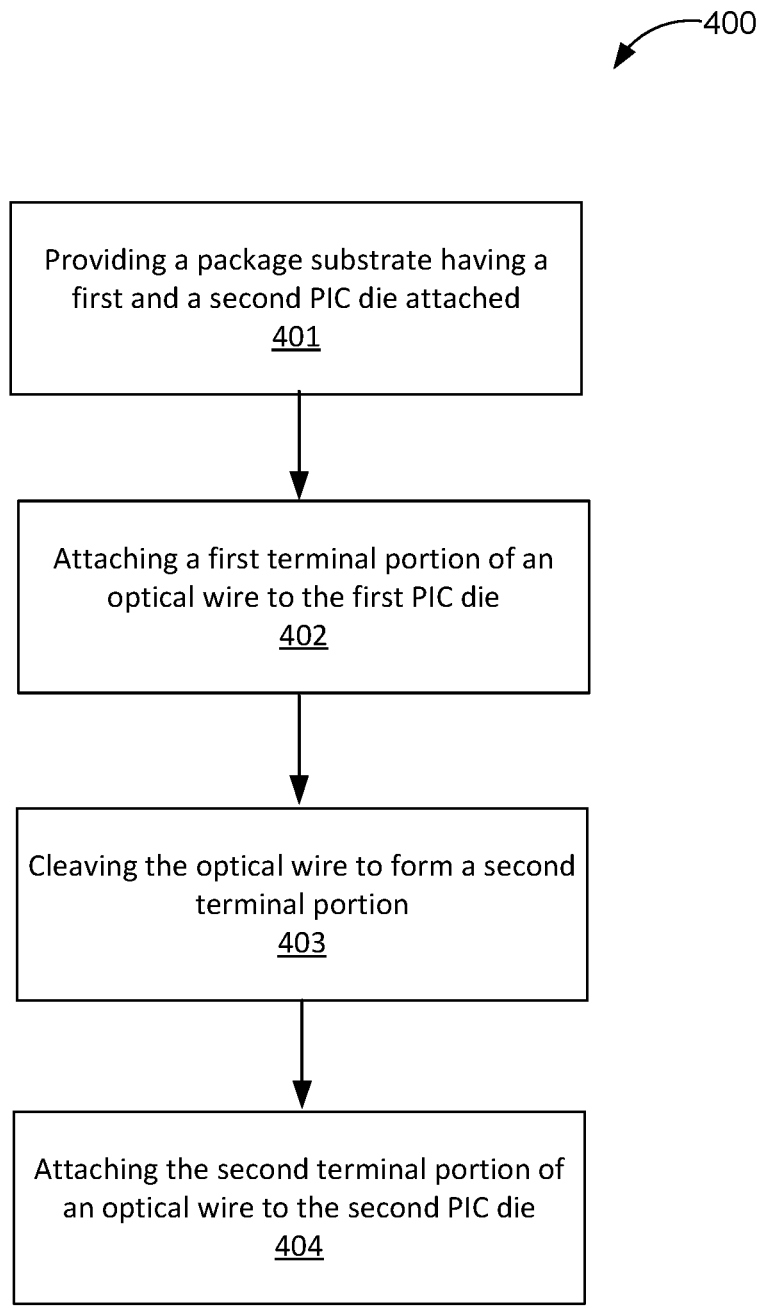
FIG. 4 illustrates a process flow chart summarizing a first exemplary method of making an optoelectronic multi-chip package, according to some embodiments of the disclosure.

FIG. 4 illustrates process flow chart 400 summarizing an exemplary method of making optoelectronic multi-chip package 100 according to some embodiments of the disclosure.

At operation 401, a partially complete optical package is provided. As an example, the partially complete package may be similar to package 100 shown in FIG. 1A as a multi-chip (optoelectronic) package (MCP) in process. The partially-complete package may comprise at least a first PIC die (e.g., PIC die 101, FIG. 1A) and a second PIC die (e.g., PIC die 102, FIG. 1A). The first and second PIC dies may carry any type of microphotonic component, such as, but not limited to: optical fibers, integrated waveguides, grating couplers, microlenses, lasers, transceivers, optical switches, etc.

Integrated waveguides may include both buried and ridge waveguides as described above. Integrated waveguides may be part of an array, as shown in FIG. 2A or as isolated waveguides. Optical fibers may be carried as an array within V-grooves, for example, on a silicon substrate, as shown in FIG. 1A.

At operation 402, an end portion of a continuous spool of optical wire (e.g., optical wire 113) may be grasped in a manipulating tool, such as robotic pick and place manipulator, collet, tweezers or similar device having clamping jaws or other appendages. In some embodiments, a bonding tool having similar functionality to conventional wire bonding tools may be employed. In a bonding tool, a grasping nozzle or collet may be employed. A spool or coil of optical wire may be threaded through the nozzle or collet. A first terminal portion of the optical wire may extend from the nozzle, which is positioned, for example by a robotic arm, to place the terminal portion of the optical wire within an alignment trench on the first PIC die. Once positioned, the optical wire may be held in place by the manipulation tool or by a secondary tool, such as a block that is lowered over the terminal portion of the optical wire. The terminal portion may be pressed into the alignment trench for secure seating, for example by the secondary tool. When seated into the alignment trench, the terminal portion of the optical wire may be mechanically constrained from lateral and vertical motion as described above. The optical wire may be aligned with an optical aperture, such as the core of a waveguide.

In some embodiments, an adhesive, such as an uncured epoxy, may be dispensed over the terminal portion, followed by a photo- or thermal activation treatment by an ultraviolet (UV) laser or an IR laser. In some embodiments, the optical wire may be coated with an adhesive substance, such as a partially cured epoxy. Once the optical wire terminal portion is positioned within the alignment trench, the adhesive coating of the terminal portion may be photoactivated or thermally activated by laser to cement the optical wire in place. Attachment of the first terminal portion of the optical wire to the first PIC die is completed.

At operation 403, the optical wire is drawn by sliding the nozzle or collet rearward, away from the attached first terminal portion. The optical wire may be unspooled in this manner, until a desired length of optical wire is unwound. The desired length may approximate the distance between the first PIC die and the second PIC die. The optical wire may be cleaved to size by a blade or shear.

At operation 404, the second terminal portion of the optical wire may be grabbed and held by the manipulation tool and placed in the second alignment trench on the second PIC die. The attachment process for the second terminal portion may be substantially the same as for the first terminal portion.

FIGS. 5A-5F illustrate cross-sectional views in the y-z plane of a progression of exemplary stages of completion of multi-chip optical package 100, according to some embodiments of the disclosure.

Figure 5A:
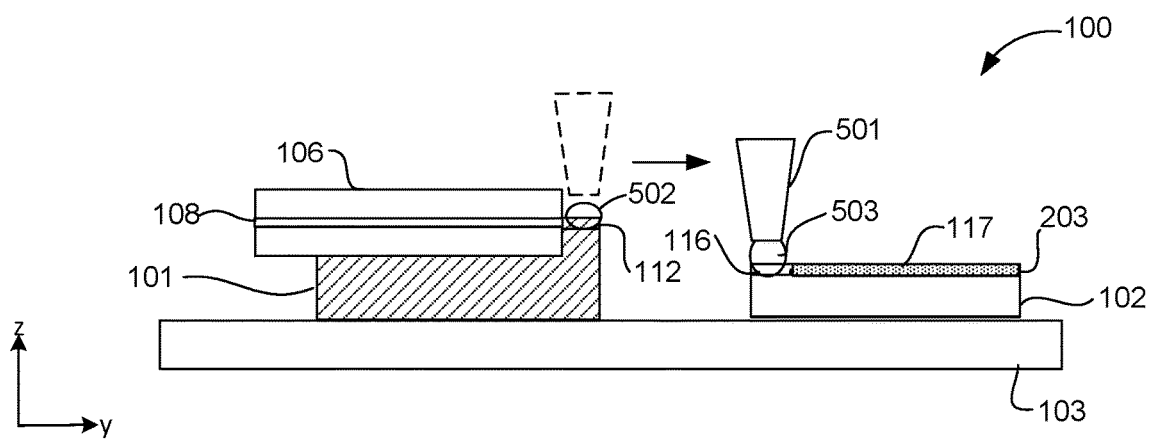
FIGS. 5A-5F illustrate cross-sectional views in the y-z plane of a progression of exemplary stages of completion of an optoelectronic multi-chip optical package, according to some embodiments of the disclosure.

In the exemplary operation shown in FIG. 5A, package 100 is received in a partially assembled state. As described above, package 100 comprises PIC dies 101 and 102 attached to substrate 103. At the point in the package assembly process depicted in FIG. 5A, PIC dies 101 and 102 are being prepared for optical wire attachment. Dispensing nozzle 501 is first positioned over alignment trench 112 on PIC die 101, and dispenses adhesive bead 502 over alignment trench 112. In some embodiments, adhesive bead 502 comprises an index-matching material, such as an index matching epoxy, to match the refractive indices of the optical wire to be attached and core 108 of optical fiber 106.

After dispensing adhesive bead 502, dispensing nozzle 501 may be translated and repositioned over alignment trench 116 on PIC die 102. A second adhesive bead 503 is deposited over alignment trench 116. Similarly, adhesive bead 503 may facilitate matching of refractive indices between the optical wire to be attached and core 203 of ridge waveguide 117.

Dispensing nozzle 501 may be part of a tool that has certain similarities to a wire bonding tool. Adhesive dispensing may be optionally omitted for pre-coated optical wire as described above.

Figure 5B:
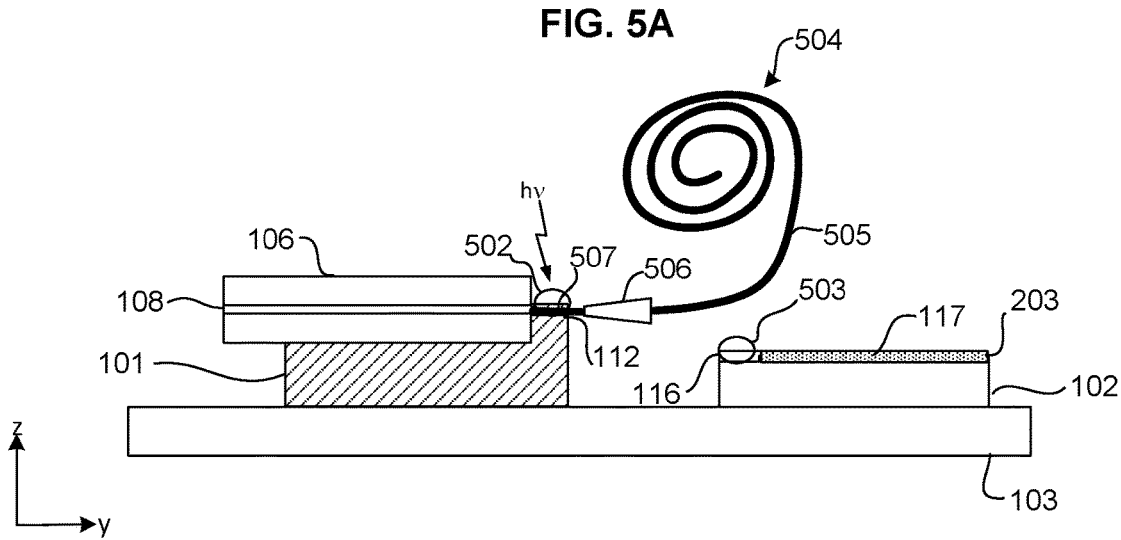

In the exemplary operation shown in FIG. 5B, partial-assembled package 100 may be placed in proximity of optical wire spool 504. Optical wire spool 504 may be pre-formed in a separate process. In some embodiments, optical wire spool 504 comprises a continuous fiber of silica-based glass, such as, but not limited to, E glass, and other suitable glasses mentioned above. The diameter of the drawn glass fiber contained within optical wire spool 504 may range between approximately 5 microns to approximately 25 microns, substantially constant along its length.

Subsequent to dispensing adhesive bead 502, a portion of glass fiber 505 may be fed through collet 506, which may be positioned proximally to alignment trench 112, allowing a terminal portion 507 to insert within alignment trench 112. In some embodiments, a press tool may follow to ensure that terminal portion 507 is fully seated (e.g., countersunk) into alignment trench 112 and passively aligned to core 108 of optical fiber 106. Collet 506 may comprise clamping jaws to hold terminal portion 507 in place while a light source, for example a suitable UV laser or an IR laser, irradiates adhesive bead 502 (or coating 205, not shown) with light to photo- or thermally cure, respectively, adhesive bead 502. Fully cured adhesive bead 502 (or alternatively, polymeric coating such as coating 205 comprising an adhesive) may permanently bond terminal portion 507 within alignment trench 112, whereby terminal portion 507 is self-aligned with core 108. At this stage in the exemplary assembly process, attachment of terminal portion 507 to PIC die 101 is complete. Terminal portion 507 may be the first terminal portion of the incipient optical wire to be attached to PIC die 102 in the subsequent operation. Although not shown, it is understood that terminal portion 507 may alternatively be coated with a polymeric material similar to coating 205, as shown in FIG. 2B. In some embodiments, the polymeric coating may comprise an adhesive that is photo-heat-activated by laser illumination, as described above. Alternatively, the coating may be non-adhesive thermoplastic or photodegradable material, and is deformable upon exposure to laser illumination, as described above.

Figure 5C:
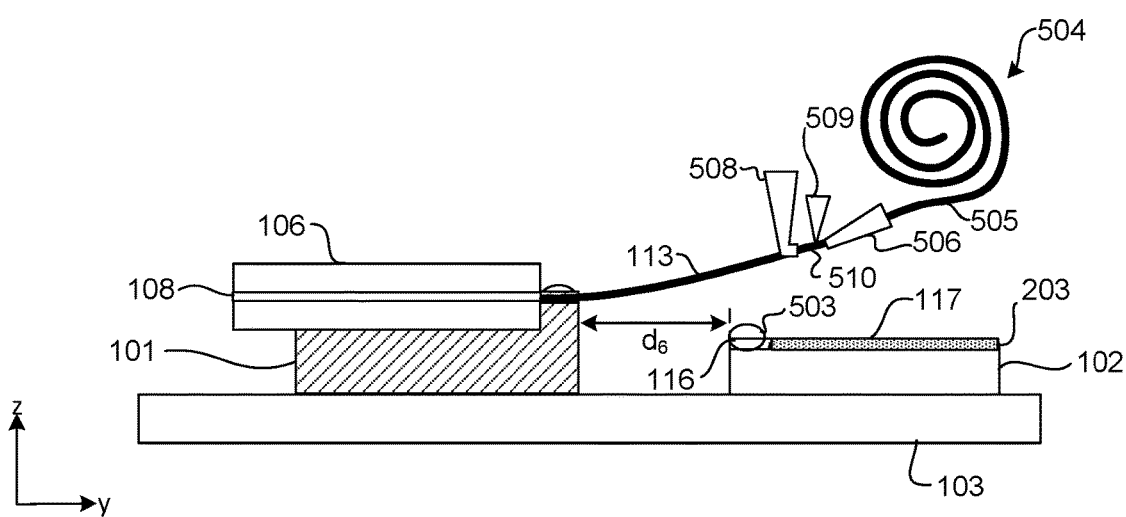

In the exemplary operation shown in FIG. 5C, glass fiber spool 504 may be translated laterally and vertically with respect to package 100, enabling a length of glass fiber 505 to be drawn and fed through collet 506. For instance, the length of glass fiber 505 may span at least a distance $d_6$ between PIC dies 101 and 102 (e.g., 0.5 to 2 mm). It is noted that the length of glass fiber 505 extended from collet 506 may have a length in excess of distance $d_6$. Clamping tool 508 may grasp glass fiber 505 near collet 506, where after glass fiber 505 may be cleaved at a suitable position by blade 509, creating optical wire 113. A short end length of optical fiber 505 may protrude from clamping tool 508, forming second terminal portion 510.

Figure 5D:
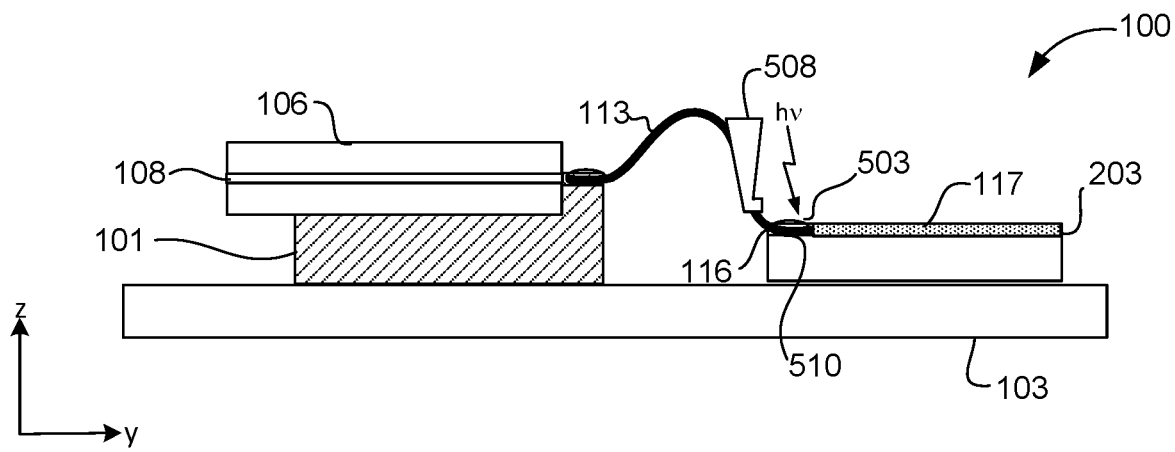

In the exemplary operation shown in FIG. 5D, clamping tool 508 may be maneuvered to insert terminal portion 510 into alignment trench 116, where adhesive bead 503 may encapsulate terminal portion 510. In the process of positioning terminal portion 510, optical wire 113 may have a length in excess of distance $d_6$ between PIC dies 101 and 102, requiring bending within at least the y-z plane as shown to conform to distance $d_6$. Further bending within, for example, the x-y plane, may also be required if waveguide 117 has a smaller pitch than optical fiber 106 (e.g., see FIGS. 1E and 1F) In some embodiments, seating of terminal portion 510 in alignment trench 116 may be assisted by a block or other insertion aid device (e.g., see exemplary devices in FIGS. 8A-8D) to ensure that terminal portion 510 is countersunk within alignment trench 116. Clamping tool 508 may provide sufficient force to constrain terminal portion 510 within alignment trench 116, enabling self-alignment of terminal portion 510 with core 203 of waveguide 117.

Figure 5E:
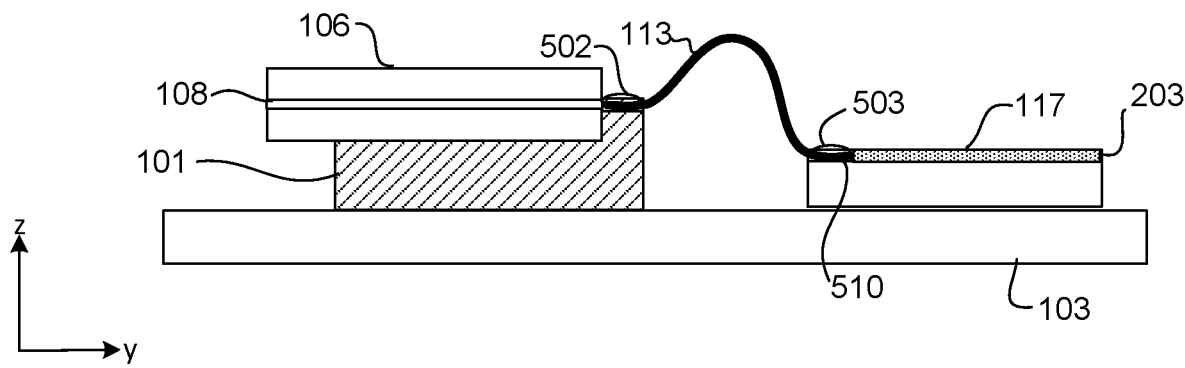

Once aligned, adhesive bead 503 may be fully cured by UV or IR light (e.g., from a laser source as described above). At this stage, optical wire is fully attached to both PIC dies 101 and 102, optically coupling optical fiber 106 and ridge waveguide 117, as shown in FIG. 5E. Optical wire 113 is a freely suspended component, not having mechanical support of an underlying or supporting structure. As described earlier in the disclosure, optical wire 113 may have sufficient stiffness to be self-supporting, not requiring additional support structures. Adhesive beads 502 and 503 may sufficiently bond optical wire 113 to PIC dies 101 and 102, providing adequate immunity to mechanical deformations that could potentially strain the attachment points of optical wire 113.

Figure 5F:
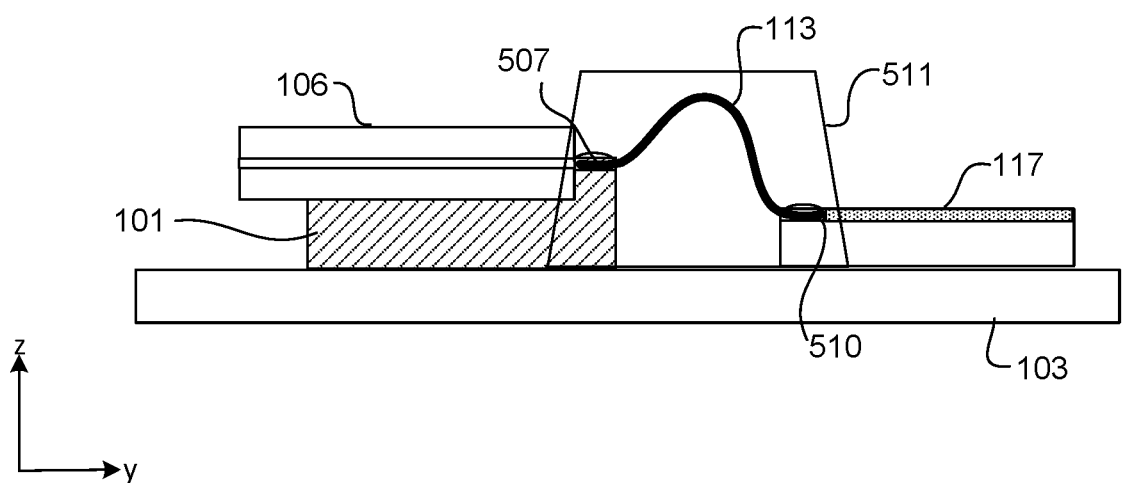

In the exemplary operation shown in FIG. 5F, an additional encapsulant 511 may be formed over optical wire 113, encapsulating optical wire 113, optionally including terminal portions 507 and 510. Encapsulant 511 may comprise a potting epoxy having a lower refractive index than optical wire 113. Encapsulant 511 may also be employed as packaging encapsulant. Encapsulant 511 may further stabilize optical wire 113 from mechanical stresses, for example, due to vibration and handling.

Figure 6:
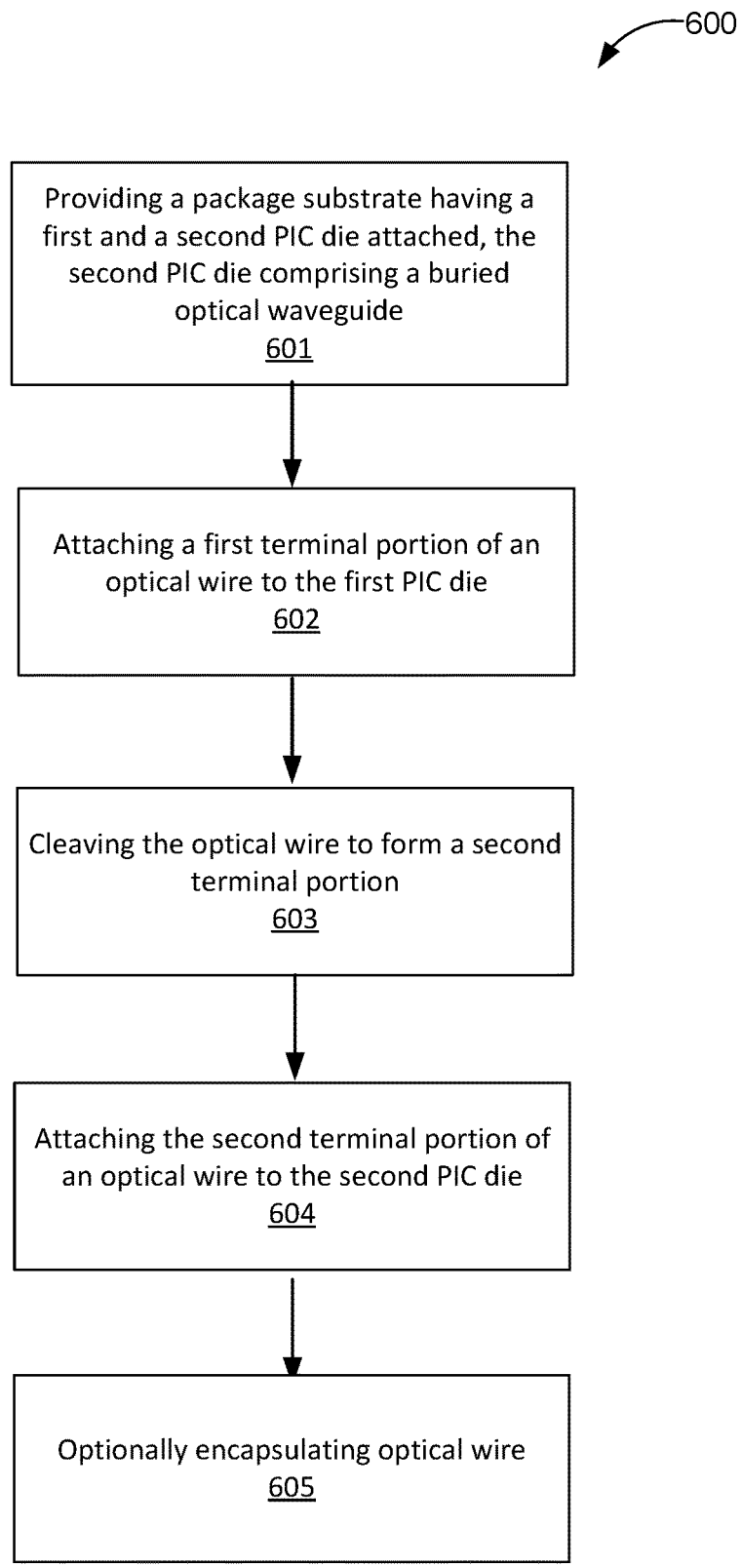
FIG. 6 illustrates a flow chart summarizing a second exemplary process for making an optoelectronic multi-chip package, according to some embodiments of the disclosure.

FIG. 6 illustrates flow chart 600 summarizing an exemplary process for making optoelectronic multi-chip package 300, according to some embodiments of the disclosure.

At operation 601, a partially complete optical multi-chip package is provided. As an example, the partially complete package may be similar to package 300 shown in FIG. 3A as a multi-chip (optical) package (MCP) in process. The partially-complete package may comprise at least a first PIC die (e.g., PIC die 301, FIG. 3A) and a second PIC die (e.g., PIC die 302, FIG. 3A). The first and second PIC dies may carry any type of microphotonic component, such as, but not limited to: optical fibers, integrated waveguides, grating couplers, microlenses, lasers, transceivers, optical switches, etc. In the example, the first PIC die (e.g., PIC die 301) carries an plurality of optical fibers arranged as a regularly space array (e.g., optical fibers 106), and the second PIC die (e.g., PIC die 302) carries an plurality of buried waveguides (e.g., buried waveguides 310), also arranged as a regularly spaced array. Optical fibers may be seated within V-grooves, for example, on a silicon substrate, as shown in FIG. 1A.

At operation 602, an end portion of a continuous spool of optical wire (e.g., optical wire 113) may be grasped in a manipulating tool, such as robotic pick-and-place manipulator, collet, tweezers or similar device having clamping jaws or other appendages. In some embodiments, a bonding tool having similar functionality to conventional wire bonding tools may be employed. In a bonding tool, a grasping nozzle or collet may be employed, such as the exemplary clamping devices shown in FIGS. 8A and 8B. A spool or coil of optical wire may be threaded through the nozzle or collet. A first terminal portion of the optical wire may extend from a collet, which is positioned, for example by a robotic arm, to place the terminal portion of the optical wire within an alignment trench on the first PIC die. Once positioned, the optical wire may be held in place by the manipulation tool or by a secondary tool, such as a block that is lowered over the terminal portion of the optical wire (e.g., block 812 in FIG. 8B). The terminal portion may be pressed into the alignment trench for secure seating, for example by the secondary tool. When seated into the alignment trench, the terminal portion of the optical wire may be mechanically constrained from lateral and vertical motion as described above. The optical wire may be self-aligned with an optical aperture, such as the core of an optical fiber.

In some embodiments, an adhesive, such as an uncured epoxy, may be dispensed over the terminal portion, followed by a photo- or thermal activation treatment by an ultraviolet (UV) laser or an IR laser. In some embodiments, the optical wire may be coated with a polymeric coating (e.g., coating 205) that may comprise an adhesive substance, such as a partially cured epoxy, as shown in FIGS. 2B and 2C. Once the optical wire terminal portion is initially positioned within the alignment trench, the coating of the terminal portion may be photoactivated or thermally activated by laser to cement the optical wire in place or alternatively to cause the optical wire to seat within the alignment trench and center itself with respect to the optical waveguide. At this stage, attachment of the first terminal portion of the optical wire to the first PIC die may be complete.

At operation 603, the optical wire (e.g., optical wire 113) is drawn by sliding the collet rearward, away from the attached first terminal portion. The optical wire may be unspooled in this manner, until a desired length of optical wire is unwound. The desired length may approximate the distance between the first PIC die and the second PIC die. The optical wire may be cleaved to size by a blade or shear.

At operation 604, the second terminal portion of the optical wire may be grabbed and held by the manipulation tool and placed in the second alignment trench on the second PIC die. The attachment process for the second terminal portion may be substantially the same as for the first terminal portion.

At operation 605, the optical wire may be optionally encapsulated in a potting epoxy, for example, to further stabilize the freely suspended fiber against vibration and other mechanical stresses.

FIGS. 7A-7E illustrate cross-sectional views in the y-z plane of a progression of exemplary stages of completion of multi-chip optical package 300, according to some embodiments of the disclosure.

Figure 7A:
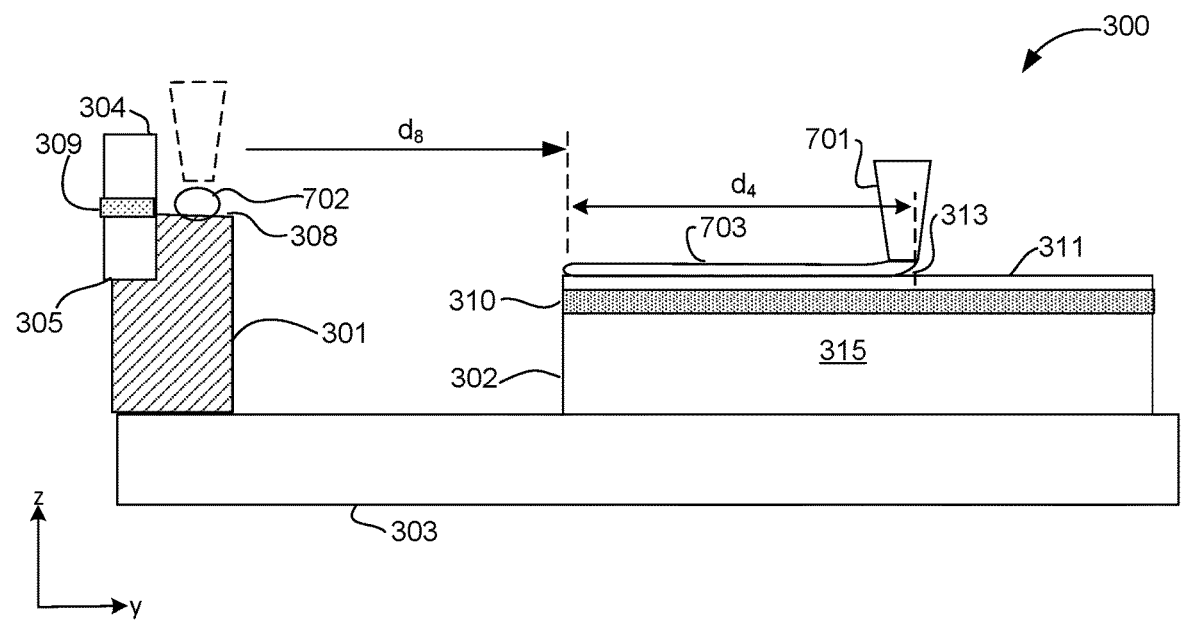
FIGS. 7A-7F illustrate cross-sectional views in the y-z plane of a progression of exemplary stages of completion of an optoelectronic multi-chip package, according to some embodiments of the disclosure.

In the exemplary operation shown in FIG. 7A, optical multi-chip package ("package") 300 is received in a partially assembled state. As described above, package 300 comprises PIC dies 301 and 302 attached to substrate 303. At the point in the package assembly process depicted in FIG. 7A, PIC dies 301 and 302 are being prepared for optical wire attachment. PIC die 302 comprises buried waveguide core 310, and alignment trench 313 that is recessed in cladding material 315, and extends a distance $d_4$ over buried waveguide 310. Dispensing nozzle 701 is first positioned over alignment trench 308 on PIC die 301, and subsequently dispenses adhesive bead 702 over alignment trench 308. As noted above, adhesive bead 702 may comprise an index-matching material, such as an index matching epoxy, to match the refractive indices of the optical wire to be attached and core 309 of optical fiber 304.

After dispensing adhesive bead 702, dispensing nozzle 701 may be translated and repositioned over alignment trench 313 on PIC die 302. A second dispense of adhesive is performed, whereby adhesive strip 703 is deposited over alignment trench 313 by translating dispensing nozzle 701 a distance $d_8$ to alignment trench 313. Adhesive bead 703 may be dispensed by further translating dispensing nozzle 701 by the distance $d_4$. Adhesive bead 703 may similarly facilitate matching of refractive indices between the optical wire to be attached and buried waveguide 310. As noted above, adhesive dispensing may be optionally omitted for pre-coated optical wire.

Figure 7B:
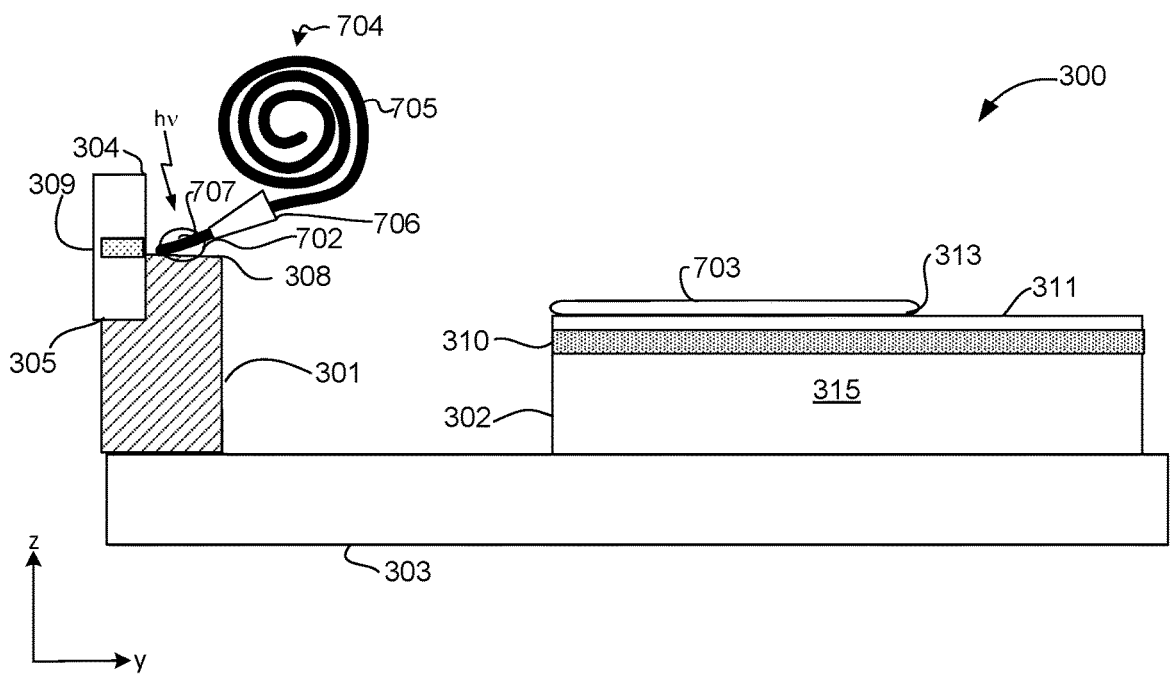

In the exemplary operation shown in FIG. 7B, partial-assembled package 300 may be placed in proximity of optical wire spool 704. Optical wire spool 704 may be pre-formed in a separate process. Comments regarding optical wire spool 504 noted above may apply to optical wire spool 704.

Subsequent to dispensing adhesive bead 702, a portion of glass fiber 705 may be fed through collet 706, which may be positioned proximally to alignment trench 308, allowing a terminal portion 707 to insert within alignment trench 308. In some embodiments, a press tool may follow to ensure that terminal portion 707 is countersunk into alignment trench 308 and passively aligned to core 309 of optical fiber 304. Collet 706 may comprise clamping jaws to hold terminal portion 707 in place while a light source, (e.g., a suitable UV laser or an IR laser) may irradiate adhesive bead 702 (or adhesive coating, not shown) with light to photo- or thermally cure, respectively, adhesive bead 702. Fully cured adhesive bead 702 (or alternatively, adhesive coating, not shown) may permanently bond terminal portion 707 within alignment trench 308, whereby terminal portion 707 is self-aligned with core 309. At this stage in the exemplary assembly process, attachment of terminal portion 707 to PIC die 301 is complete. Terminal portion 707 may be the first terminal portion of the incipient optical wire to be attached to PIC die 302 in the subsequent operation.

Figure 7C:
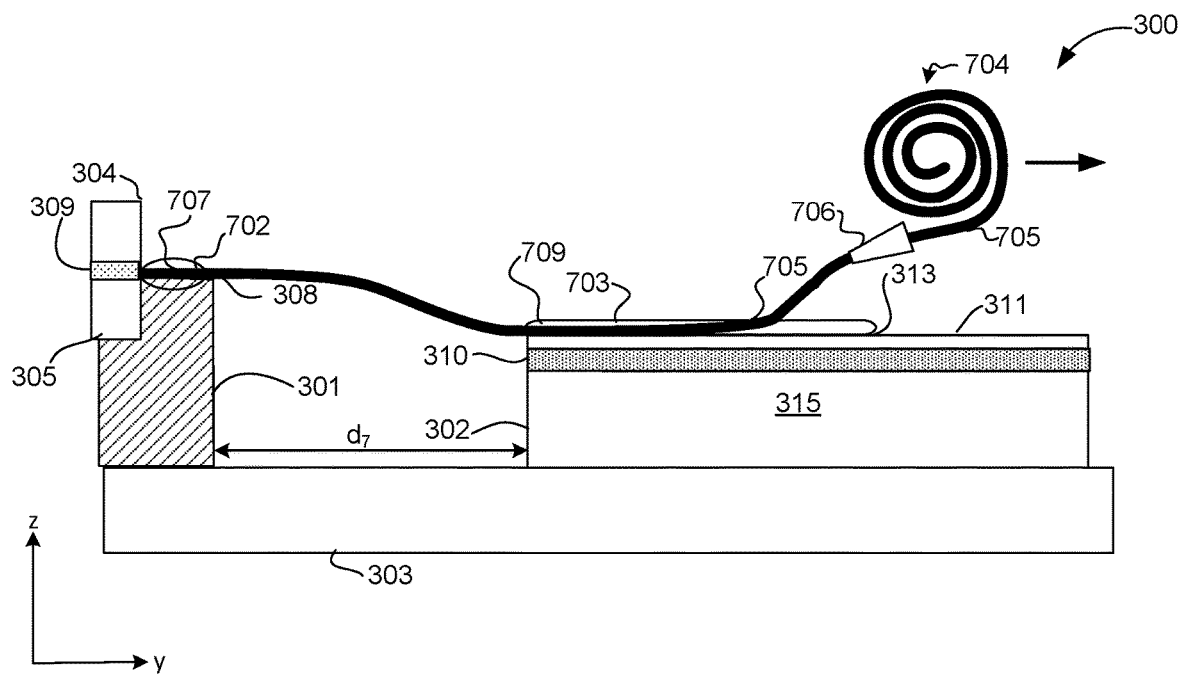

In the exemplary operation shown in FIG. 7C, glass fiber spool 704 may be translated laterally and vertically with respect to package 300, enabling a length of glass fiber 705 to be drawn and fed through collet 706. For instance, the length of glass fiber 705 may span at least a distance $d_7$ between PIC dies 301 and 302 (e.g., 0.5 to 2 mm), and forms optical wire 307 in subsequent operations. It is noted that the length of glass fiber 705 extended from collet 706 may have a length in excess of distance $d_7$. A portion of glass fiber 705 may be laid over alignment trench 313, forming second terminal portion 709 in subsequent operations. along glass fiber 705, as indicated by the arrow in the figure, continuing to insert glass fiber 705. The portion of glass fiber 705 inserted into alignment trench 313 is the second terminal portion 709 of the incipient optical wire.

Figure 7D:
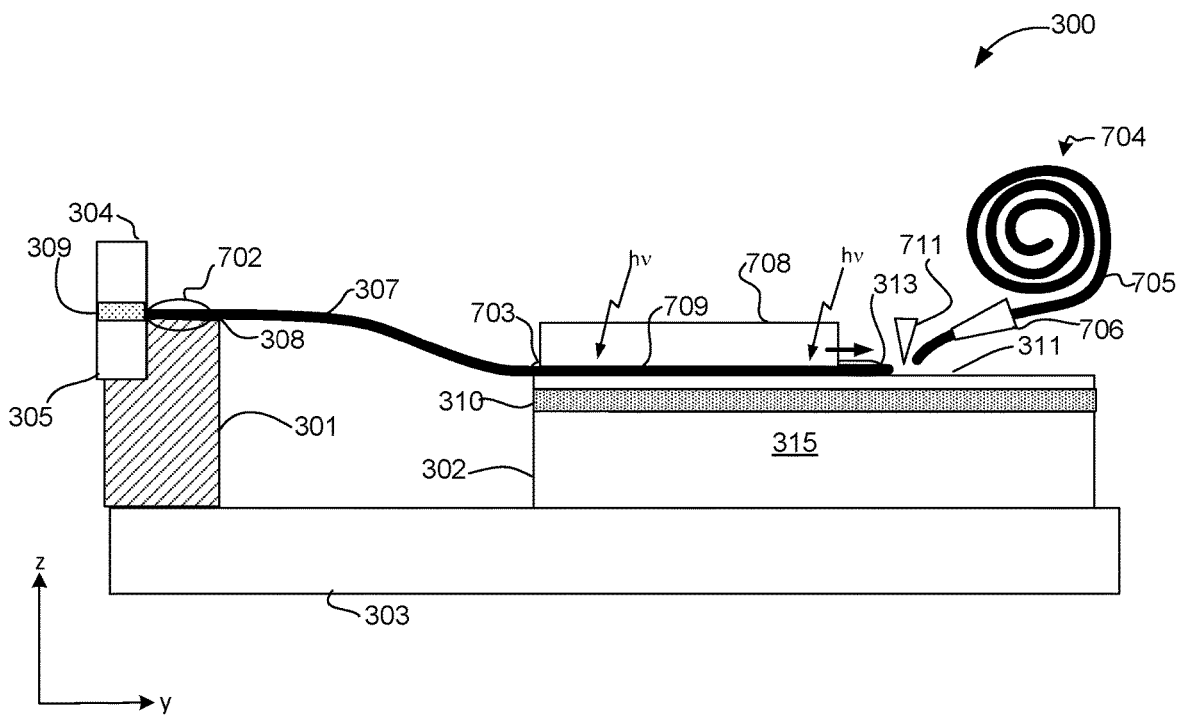

In the exemplary operation shown in FIG. 7D, block 708 may be lowered and pressed against glass fiber 705 to complete insertion of terminal portion 709 into alignment trench 313. Pressure from block 708 may seat glass fiber 705 into alignment trench 313, ensuring mechanical constraint and alignment with buried waveguide core 310. Following seating, glass fiber 705 may be cleaved at a suitable position by blade 711, forming optical wire 307. Adhesive bead 703 may at least partially encapsulate terminal portion 709. In the process of positioning terminal portion 709, optical wire 307 may have a length in excess of distance $d_7$ between PIC dies 301 and 302, requiring bending within at least the y-z plane as shown to conform to distance $d_7$. Further bending within, for example, the x-y plane, may also be required if buried waveguide 310 has a smaller pitch than optical fiber 304 (e.g., see FIGS. 1E and 1F).

Once aligned, adhesive bead 703 may be fully cured by UV or IR light (e.g., from a laser source as described above).

Figure 7E:
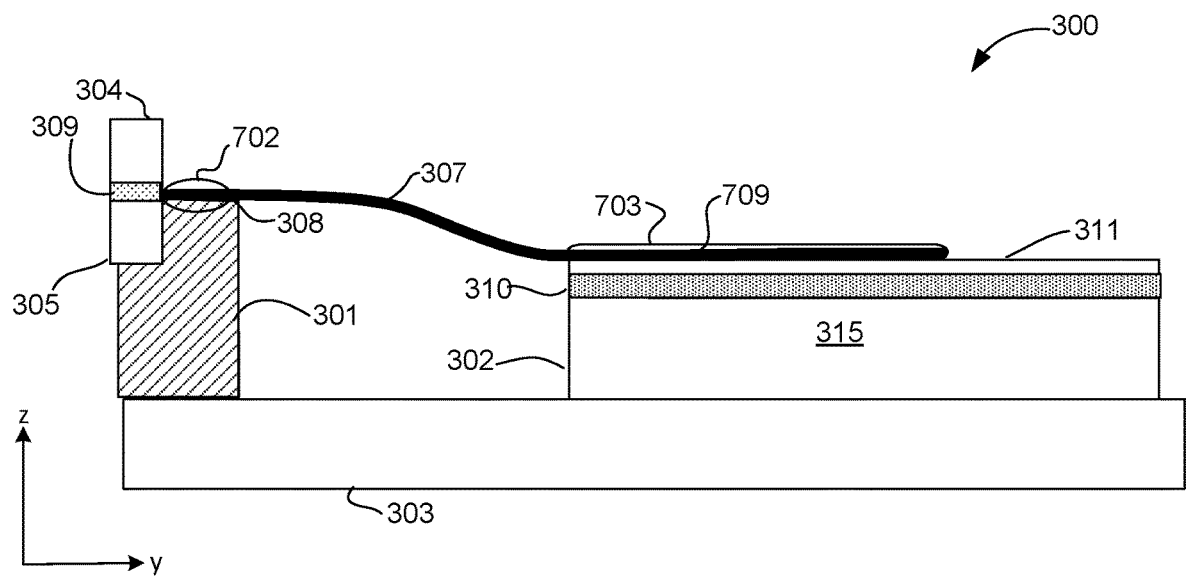

Block 708 may be transparent to the UV or IR light, permitting the laser to shine light through block 708 while applying pressure to prevent movement of glass fiber 705. At this stage, optical wire may be fully attached to both PIC dies 301 and 302, optically coupling optical fiber 304 and buried waveguide 310, as shown in FIG. 7E. As noted above, optical wire 307 is a freely suspended component, not having mechanical support of an underlying or supporting structure. As described earlier in the disclosure, optical wire 307 may have sufficient stiffness to be self-supporting, not requiring additional support structures. Adhesive 702 and 703 may sufficiently bond optical wire 307 to PIC dies 301 and 302, providing adequate immunity to mechanical stresses and displacements that could potentially strain the attachment points of optical wire 307.

Figure 7F:
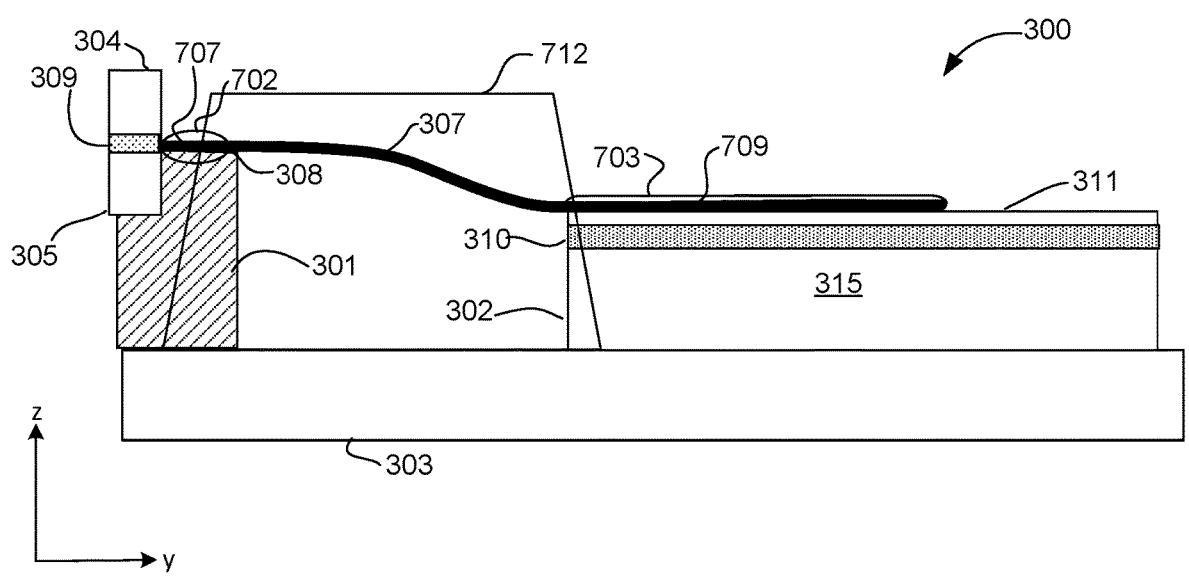

In the exemplary operation shown in FIG. 7F, encapsulant 712 may be formed over optical wire 307, encapsulating optical wire 307, optionally including terminal portions 707 and 709. Encapsulant 712 may comprise a potting epoxy having a refractive index that is less than optical wire 307. The potting epoxy may also be employed as packaging encapsulant. Encapsulant 712 may further stabilize optical wire 307 from mechanical stresses, for example, due to handling or vibration, that may cause displacement of optical wire 307.

Figure 8A:
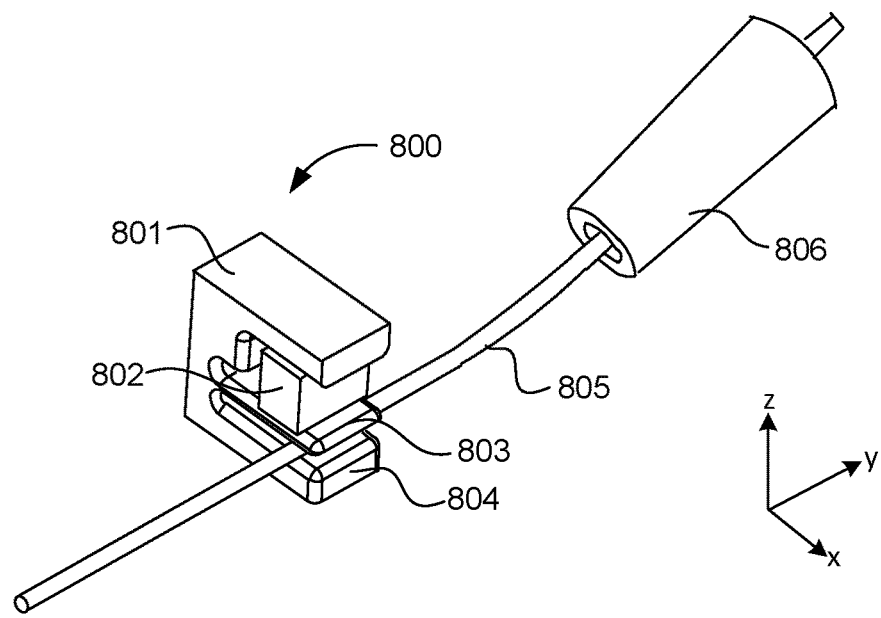
FIG. 8A illustrates an isometric view of an exemplary clamping tool for manipulating a continuous glass fiber during assembly of optoelectronic multi-chip packages according to some embodiments of the disclosure.

FIG. 8A illustrates an isometric view of exemplary clamping tool 800 for manipulating a continuous glass fiber during assembly of optoelectronic multi-chip packages 100 or 300 according to some embodiments of the disclosure.

Clamping tool 800 comprises cantilever beam 801, piezo block 802, tongue 803 and base 804. A section of glass fiber 805 may be fed through collet 806 into clamping tool 800 between tongue 803 and base 804. To grasp glass fiber 805, a clamping force is applied by expansion of piezo block 802, forcing tongue 803 against glass fiber 805. Cantilever beam 801 provides reactive force to hold piezo block 802 stationary while expanding, causing tongue 803 to deflect against glass fiber 805.

Figure 8B:
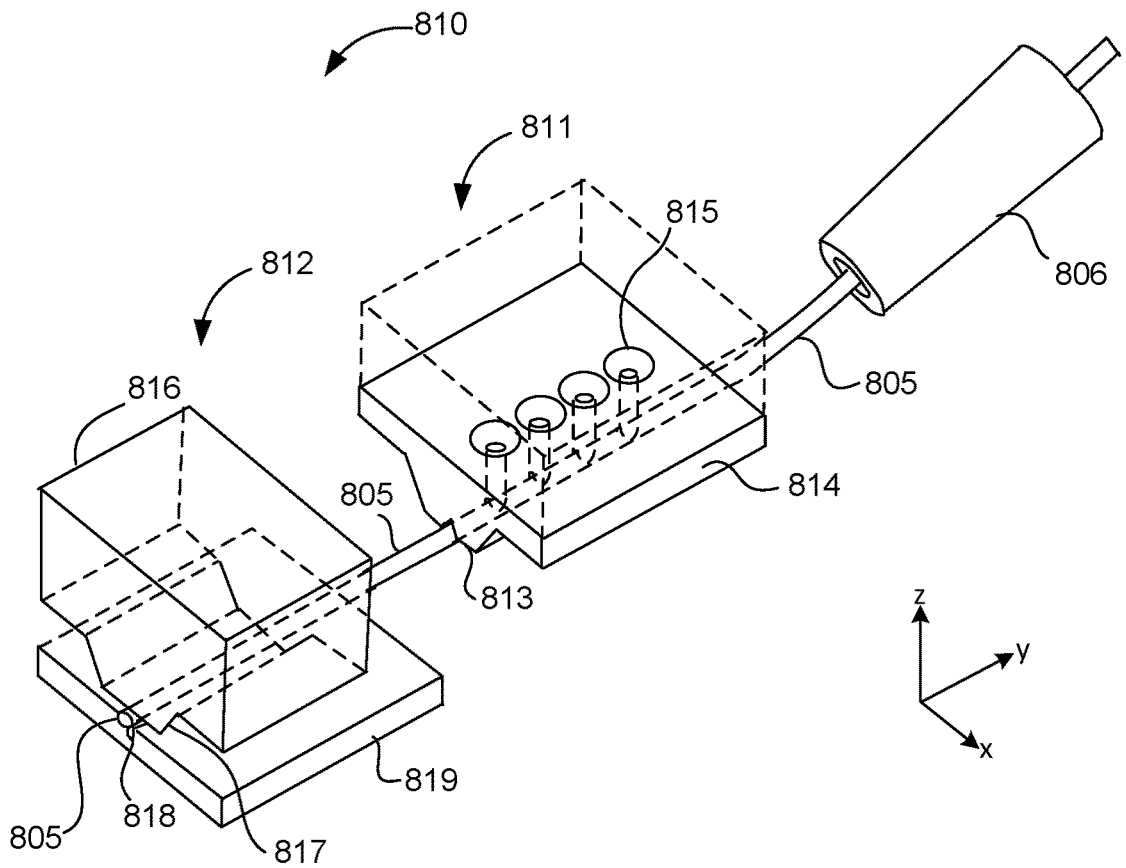
FIG. 8B illustrates an isometric view of an exemplary fiber manipulation tool comprising a vacuum fiber chuck and press for manipulating a continuous glass fiber during assembly of optoelectronic multi-chip packages, according to some embodiments of the disclosure.

FIG. 8B illustrates an isometric view of exemplary fiber manipulation tool 810 comprising vacuum fiber chuck 811 and press 812 for a continuous glass fiber during the assembly of optoelectronic multi-chip packages 100 and 300, according to some embodiments of the disclosure.

As an alternative to clamping tool 800 shown in FIG. 8A, fiber chuck 811 may grasp glass fiber 805 by vacuum, whereby glass fiber 805 is engaged within groove 813 on lower portion of base 814 and held in place by suction through one or more vacuum ports 815 extending through base 814. A vacuum manifold, indicated by the dashed lines above chuck 811, may be in communication with vacuum ports 814.

Press 812 comprises body 816, which may be transparent to IR and/or UV light, according to some embodiments. Body 816 comprises nose 817, which may be pressed against glass fiber 805 over alignment trench 818 on substrate 819. In some embodiments, the light transparency of body 816 may enable laser light to pass through body 816 to cure adhesive (e.g., adhesive beads 702 and 703) over glass fiber 805 when inserted into alignment trench 818.

Fiber chuck 811 and press 812 may be employed in tandem as part of a fiber insertion tool for assembly of optical wires (e.g., optical wires 113) within alignment trenches (e.g., alignment trench 818). Alternatively, fiber chuck 811 and press 812 may be used as separate tools.

Figure 8C:
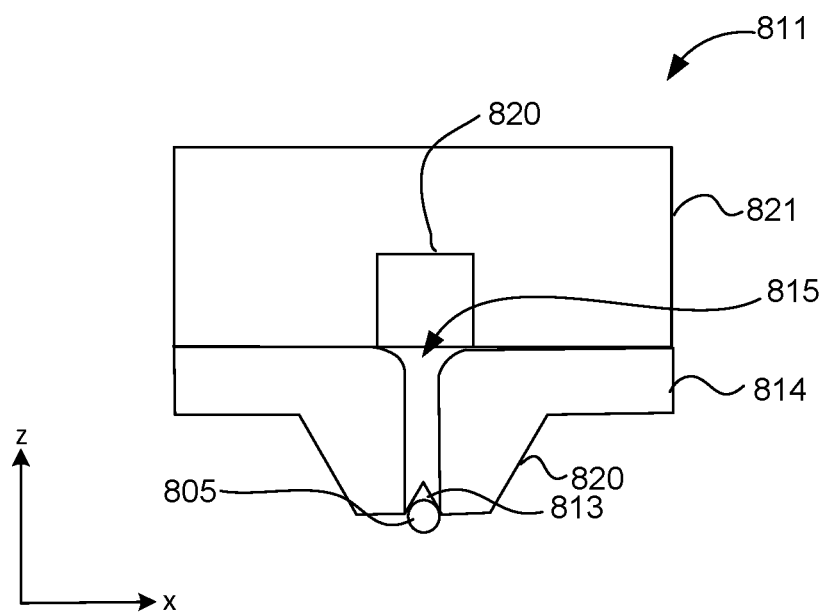
FIG. 8C illustrates a cross-sectional view in the x-z plane of an exemplary fiber chuck engaging a glass fiber, according to some embodiments of the disclosure.
Figure 8D:
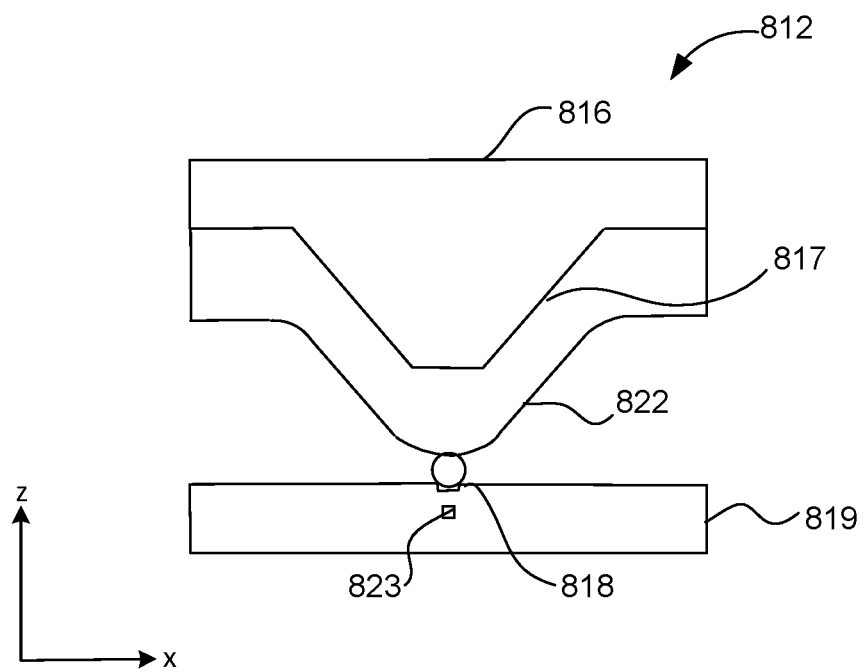
FIG. 8D illustrates a cross-sectional view in the x-z plane of an exemplary press engaging a glass fiber, according to some embodiments of the disclosure.

FIGS. 8C and 8D illustrate cross-sectional views in the x-z plane of fiber chuck 811 and press 812 engaging glass fiber 805, according to some embodiments of the disclosure.

FIG. 8C illustrates fiber chuck 811, shown in cross section to show engagement of glass fiber 805 within nose 820 of base 814. Vacuum port 815 may terminate at groove 813, in which glass fiber 805 is engaged and held by suction. Vacuum port 815 may be in communication with manifold 820 in upper body portion 821.

FIG. 8D illustrates press 812, shown in cross section to shown engagement of glass fiber 805 with nose portion 817. While in the illustrated embodiment nose portion 817 is flat, it may include a groove or indentation to aid in holding glass fiber 805. Body 816 may be transparent to IR and/or UV light to enable laser light to be shined through to nose 817 for curing of adhesive, as described above. In some embodiments, a compliant layer 822 comprising a transparent polymeric material such as, but not limited to, a perfluoroethylene polymer (e.g., Teflon), may be coated over nose portion 817 as shown, to aid contact between press 812 and glass fiber 805 as a deformable surface, but at the same time preventing adhesion of glass fiber 805 to nose portion 817.

Glass fiber 805 is shown seated within alignment trench 818, forming a terminal portion (e.g., terminal portion 707 and 709) of an incipient optical wire (e.g., optical wire 307). In the illustrated embodiment, glass fiber 805 is positioned over buried waveguide core 823.

Figure 9:
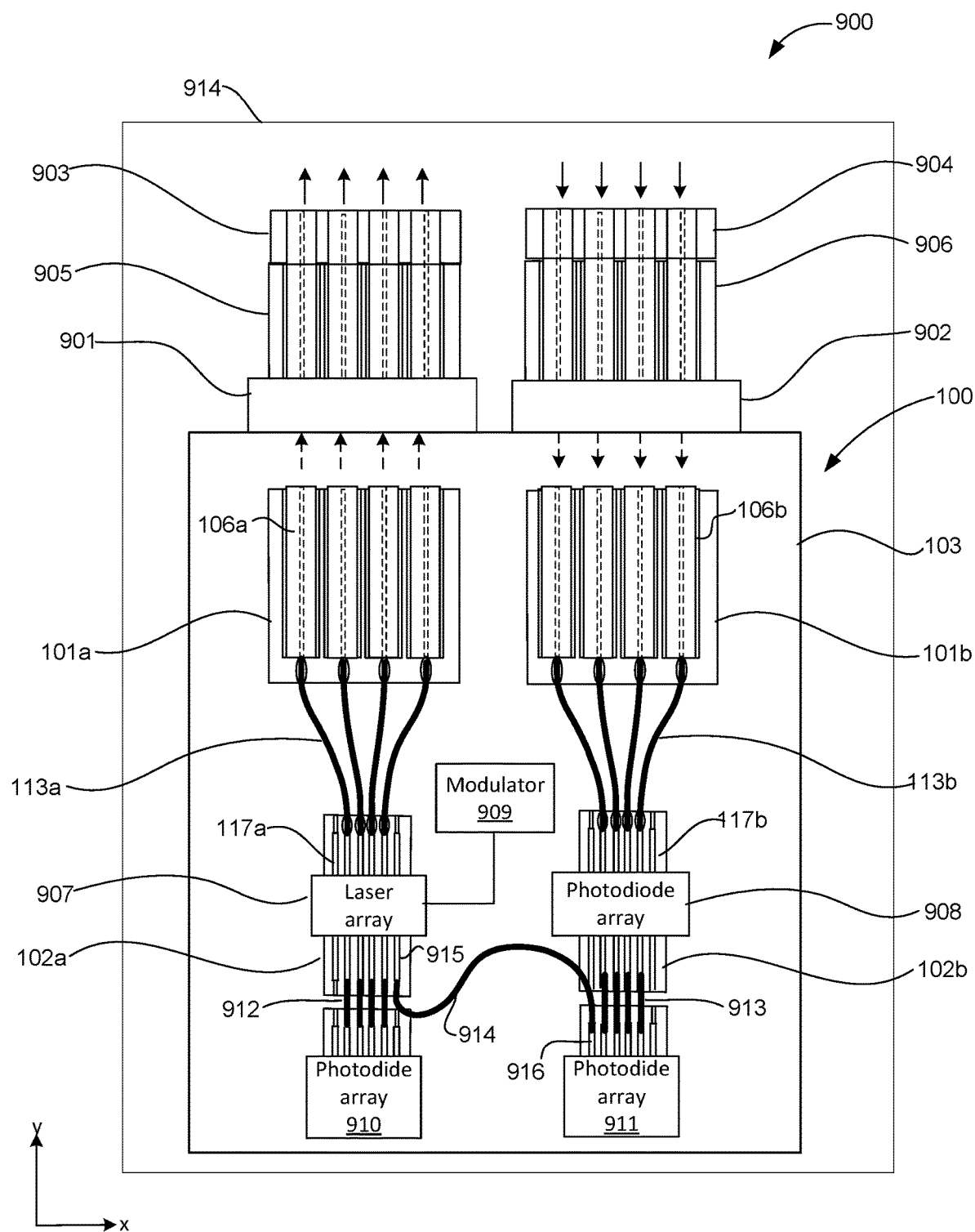
FIG. 9 illustrates a system-level view of an optoelectronic multi-chip package, according to some embodiments of the disclosure.

FIG. 9 illustrates a block diagram of system 900 including optoelectronic multi-chip package 100, according to some embodiments of the disclosure.

System 900 comprises optoelectronic multi-chip package 100 substantially as described above. Package 100 comprises one or more instances of PIC dies 101 and 102. PIC die 101 carries multiple optical fibers 106 that are coupled to photonic edge connectors 901 and 902, as indicated by input and output arrows. Edge connectors 901 and 902 may be connected to optical fiber ribbon cables 903 and 904 for output and input signals, respectively. Optical fiber ribbon cables 903 and 904 may carry high speed (e.g., up to several terabytes per second) multi-channel optical data signals, transferred through edge connectors 901 and 902. In the illustrated embodiment, ribbon cables 903 and 904 respectively carry multi-channel output and input data signals from package 100. Cables 903 and 904 may be connected to edge connectors 901 and 902 through ribbon connector ferrules 905 and 906, respectively.

Optical fibers 106a/b on PIC dies 101a/b are coupled through optical wire interconnects 113a and 113b, respectively, to waveguides 117a/b on PIC dies 102a/b, substantially as described above. Integrated waveguides 117a and 117b may carry optical signals to and from photonic devices, such as from laser array die 907 and to photodiode array die 908 as shown in the exemplary embodiment. Laser array die 907 may comprise one or more integrated diode lasers in a laser array, each laser coupled to one or more waveguides 117 on PIC die 102 through optical wires 909. As an example, laser array die 907 may comprise one or more indium phosphide (InP) lasers. Laser array die 907 may be integrated on PIC die 102a, as shown, or as a stand-alone die within package 100, interconnected to integrated waveguides 117a on PIC die 102a through optical wires 113a. Laser array die 907 may be electronically coupled to modulator 909 for optical signal generation.

Similarly, photodiode array die 908 may be integrated on PIC die 102b or a stand-alone die within package 100, interconnected to integrated waveguides 117b on PIC die 102b through optical wires 113b. As an example, photodiode array die 908 may comprise multiple silicon-germanium (SiGe) photodiodes or phototransistors to receive optical signals and covert them to electronic signals.

PIC dies 102*a/b* may be connected to photodiode array dies 910 and 911 through optical wire interconnects 912 and 913, respectively. Photonic chips including laser array die 907 and photodiode array dies 908, 910 and 911 may be comprise electronic circuitry that is electronically interconnected to signal and power routing on printed circuit board (PCB) 914 through land interconnects (not shown) on package substrate 103.

Optionally, laser array 907 may be optically coupled to photodiode array 911 through optical wire 914 that may couple waveguide 915 on die 102*a* to waveguide 916 on die 102*b*.

Figure 10:
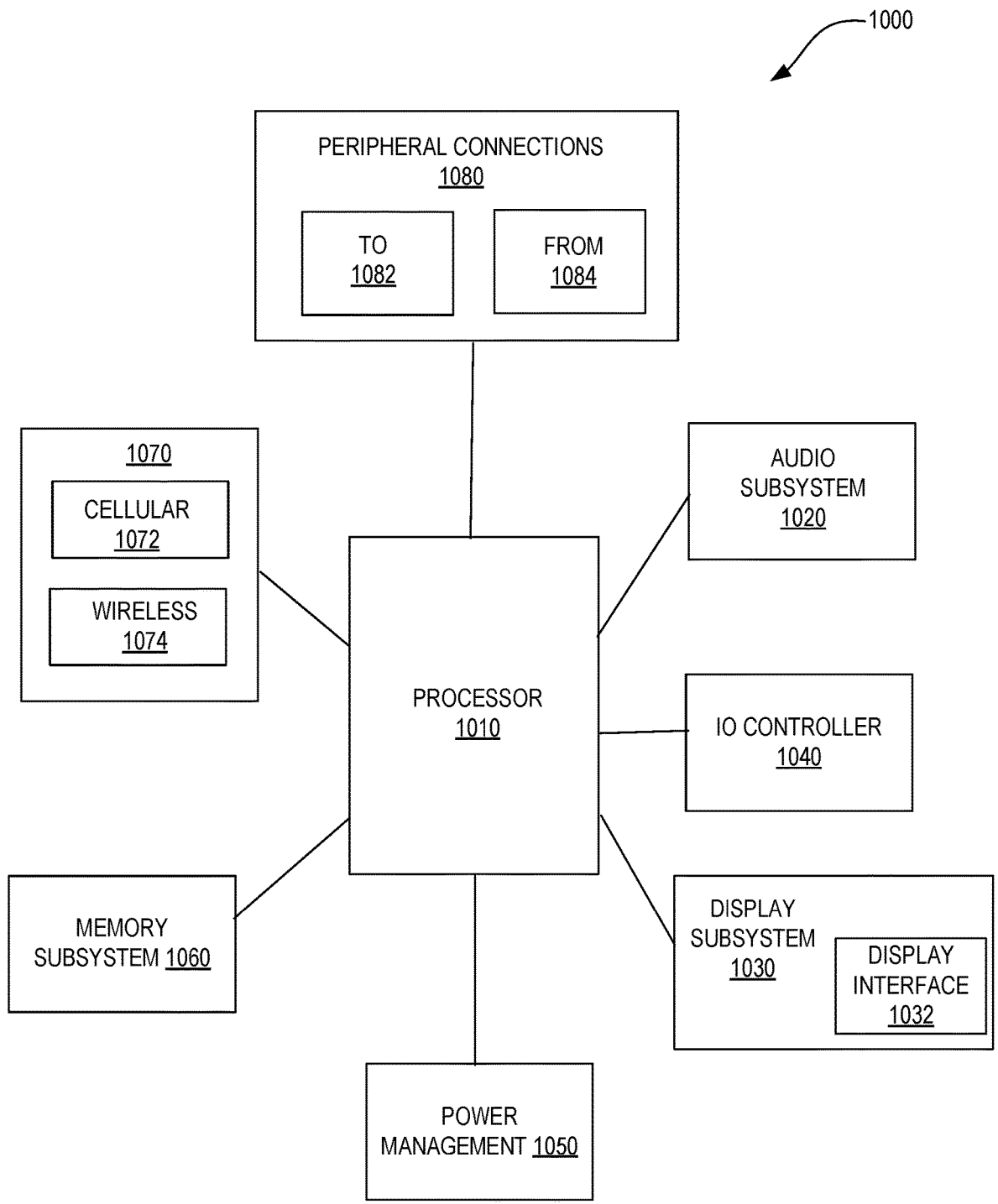
FIG. 10 illustrates a block diagram of computing device as part of a system-on-chip (SoC) package in an implementation comprising an optoelectronic multichip package according to some embodiments of the disclosure.

FIG. 10 illustrates a block diagram of computing device 1000 as part of a system-on-chip (SoC) package in an implementation comprising any of optoelectronic multichip package 100 or 300, according to some embodiments of the disclosure.

According to some embodiments, computing device 1000 represents a server, a desktop workstation, or a mobile workstation, such as, but not limited to, a laptop computer, a computing tablet, a mobile phone or smart-phone, a wireless-enabled e-reader, or other wireless mobile device. Multichip IC packages, such as, but not limited to, a single- or multi-core microprocessor (e.g., representing a central processing unit), logic dies, RF dies, high power dies, memory dies, antenna dies, comprises a packages substrate having, for example.

In some embodiments, computing device has wireless connectivity (e.g., Bluetooth, WiFi and 5G network). It will be understood that certain components are shown generally, and not all components of such a device are shown in computing device 1000.

The various embodiments of the present disclosure may also comprise a network interface within 1070 such as a wireless interface so that a system embodiment may be incorporated into a wireless device, for example, cell phone or personal digital assistant. The wireless interface includes a millimeter wave generator and antenna array. The millimeter wave generator may be part of a monolithic microwave integrated circuit.

According to some embodiments, processor 1010 represents a CPU or a GPU, and can include one or more physical devices, such as microprocessors, application processors, microcontrollers, programmable logic devices, or other processing means. Processor 1010 may be coupled to a memory controller or high-speed serial I/O interface controller, as disclosed. The processing operations performed by processor 1010 include the execution of an operating platform or operating system on which applications and/or device functions are executed. The processing operations include operations related to I/O (input/output) with a human user or with other devices, operations related to power management, and/or operations related to connecting the computing device 1000 to another device. The processing operations may also include operations related to audio I/O and/or display I/O.

In one embodiment, computing device 1000 includes audio subsystem 1020, which represents hardware (e.g., audio hardware and audio circuits) and software (e.g., drivers, codecs) components associated with providing audio functions to the computing device. Audio functions can include speaker and/or headphone output, as well as microphone input. Devices for such functions can be integrated into computing device 1000, or connected to the computing device 1000. In one embodiment, a user interacts with the computing device 1000 by providing audio commands that are received and processed by processor 1010

Display subsystem 1030 represents hardware (e.g., display devices) and software (e.g., drivers) components that provide a visual and/or tactile display for a user to interact with the computing device 1000. Display subsystem 1030 includes display interface 1032 which includes the particular screen or hardware device used to provide a display to a user. In one embodiment, display interface 1032 includes logic separate from processor 1010 to perform at least some processing related to the display. In one embodiment, display subsystem 1030 includes a touch screen (or touch pad) device that provides both output and input to a user.

I/O controller 1040 represents hardware devices and software components related to interaction with a user. I/O controller 1040 is operable to manage hardware that is part of audio subsystem 1020 and/or display subsystem 1030. Additionally, I/O controller 1040 illustrates a connection point for additional devices that connect to computing device 1000 through which a user might interact with the system. For example, devices that can be attached to the computing device 1000 might include microphone devices, speaker or stereo systems, video systems or other display devices, keyboard or keypad devices, or other I/O devices for use with specific applications such as card readers or other devices.

As mentioned above, I/O controller 1040 can interact with audio subsystem 1020 and/or display subsystem 1030. For example, input through a microphone or other audio device can provide input or commands for one or more applications or functions of the computing device 1000. Additionally, audio output can be provided instead of, or in addition to display output. In another example, if display subsystem 1030 includes a touch screen, the display device also acts as an input device, which can be at least partially managed by I/O controller 1040. There can also be additional buttons or switches on the computing device 1000 to provide I/O functions managed by I/O controller 1040.

In one embodiment, I/O controller 1040 manages devices such as accelerometers, cameras, light sensors or other environmental sensors, or other hardware that can be included in the computing device 1000. The input can be part of direct user interaction, as well as providing environmental input to the system to influence its operations (such as filtering for noise, adjusting displays for brightness detection, applying a flash for a camera, or other features).

In one embodiment, computing device 1000 includes power management 1050 that manages battery power usage, charging of the battery, and features related to power saving operation. Memory subsystem 1060 includes memory devices for storing information in computing device 1000. Memory can include nonvolatile (state does not change if power to the memory device is interrupted) and/or volatile (state is indeterminate if power to the memory device is interrupted) memory devices. Memory subsystem 1060 can store application data, user data, music, photos, documents, or other data, as well as system data (whether long-term or temporary) related to the execution of the applications and functions of the computing device 1000.

Elements of embodiments are also provided as a machine-readable medium (e.g., memory 1060) for storing the computer-executable instructions. The machine-readable medium (e.g., memory 1060) may include, but is not limited to, flash memory, optical disks, CD-ROMs, DVD ROMs, RAMs, EPROMs, EEPROMs, magnetic or optical cards, phase change memory (PCM), or other types of machine-readable media suitable for storing electronic or computer-executable instructions. For example, embodiments of the disclosure may be downloaded as a computer program (e.g., BIOS) which may be transferred from a remote computer (e.g., a server) to a requesting computer (e.g., a client) by way of data signals via a communication link (e.g., a modem or network connection).

Connectivity via network interface 1070 includes hardware devices (e.g., wireless and/or wired connectors and communication hardware) and software components (e.g., drivers, protocol stacks) to enable the computing device 1000 to communicate with external devices. The computing device 1000 could be separate devices, such as other computing devices, wireless access points or base stations, as well as peripherals such as headsets, printers, or other devices.

Network interface 1070 can include multiple different types of connectivity. To generalize, the computing device 1000 is illustrated with cellular connectivity 1072 and wireless connectivity 1074. Cellular connectivity 1072 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, or other cellular service standards. Wireless connectivity (or wireless interface) 1074 refers to wireless connectivity that is not cellular, and can include personal area networks (such as Bluetooth, Near Field, etc.), local area networks (such as Wi-Fi), and/or wide area networks (such as WiMax), or other wireless communication.

Peripheral connections 1080 include hardware interfaces and connectors, as well as software components (e.g., drivers, protocol stacks) to make peripheral connections. It will be understood that the computing device 1000 could both be a peripheral device ("to" 1082) to other computing devices, as well as have peripheral devices ("from" 1084) connected to it. The computing device 1000 commonly has a "docking" connector to connect to other computing devices for purposes such as managing (e.g., downloading and/or uploading, changing, synchronizing) content on computing device 1000. Additionally, a docking connector can allow computing device 1000 to connect to certain peripherals that allow the computing device 1000 to control content output, for example, to audiovisual or other systems.

In addition to a proprietary docking connector or other proprietary connection hardware, the computing device 1000 can make peripheral connections 1080 via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other types.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

While the disclosure has been described in conjunction with specific embodiments thereof, many alternatives, modifications and variations of such embodiments will be apparent to those of ordinary skill in the art in light of the foregoing description. The embodiments of the disclosure are intended to embrace all such alternatives, modifications, and variations as to fall within the broad scope of the appended claims.

In addition, well known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

The following examples pertain to further embodiments. Specifics in the examples may be used anywhere in one or more embodiments. All optional features of the apparatus described herein may also be implemented with respect to a method or process.

Example 1 is a photonic integrated circuit (PIC) package, comprising a first die comprising a first optical waveguide, and a first trench extending from a first edge of the first die to the first optical waveguide, wherein the first trench is aligned with the first optical waveguide, a second die comprising a second optical waveguide, and a second trench extending from a second edge of the second die to the second optical waveguide, wherein the second trench is aligned with the second optical waveguide, and an optical wire comprising a glass fiber, the optical wire comprising a first terminal portion extending within the first trench and a second terminal portion extending within the second trench, wherein the first terminal portion is aligned with the first optical waveguide and the second terminal portion is aligned with the second optical waveguide.

Example 2 includes all of the features of example 1, wherein the optical wire is one of a plurality of optical wires, individual optical wires extending between first terminal portions of first individual optical waveguides of the first die and the second terminal portions of second individual waveguides of the second die, the PIC package further comprising an encapsulate material surrounding at least portions of plurality of optical wires between the first and second dies.

Example 3 includes all of the features of examples 1 or 2, wherein the first and second trenches have a first depth and a second depth, respectively, that range between 10% and 100% of an average diameter of the glass fiber, and a first width and a second width, respectively, that range between 50% and 100% of the average diameter of the glass fiber.

Example 4 includes all of the features of any one of examples 1 through 3, wherein the first terminal portion of the optical wire has a first end that is abutted against a first terminal sidewall of the first optical waveguide, and the second terminal portion of the optical wire has a second end that is abutted against a second terminal sidewall of the second optical waveguide.

Example 5 includes all of the features of any one of examples 1 through 4, wherein the first optical waveguide is below a surface of the first die and has a buried sidewall adjacent to the surface, the first trench extending along the surface over the buried sidewall, the first terminal portion of the optical wire extending within the first trench and overlaps a portion of the buried sidewall.

Example 6 includes all of the features of any one of examples 1 through 5, wherein the first terminal portion and the second terminal portion of the optical wire are bonded to the first die and the second die, respectively, by an encapsulant comprising a polymeric material, the encapsulant having an adhesive bond between the first portion of the glass fiber and the first trench and between the second portion of the glass fiber and the second trench, respectively.

Example 7 includes all of the features of example 6, wherein the polymeric material has a first refractive index that is substantially the same as a second refractive index of at least the first optical waveguide.

Example 8 includes all of the features of any one of examples 1 through 7, wherein the optical wire has a coating comprising an adhesive polymeric material, wherein a first layer comprising the adhesive polymeric material is between the first terminal portion of the optical wire and the first trench, and a second layer comprising the adhesive polymeric material is between the second terminal portion of the optical wire and the second trench.

Example 9 includes all of the features of any one of examples 1 through 8, wherein the optical wire comprises any of silicon, oxygen, boron, calcium or aluminum, and wherein at least a portion of the silicon, oxygen, boron calcium or aluminum are combined as calcium aluminoborosilicate or calcium aluminosilicate glass.

Example 10 includes all of the features of any one of examples 1 through 9, wherein the glass fiber has an average diameter ranging between 5 microns and 30 microns.

Example 11 includes all of the features of any one of examples 1 through 10, wherein the first trench and second trench have a width ranging between 3 microns and 10 microns, and a depth ranging between 1.5 microns and 10 microns.

Example 12 is a photonic integrated circuit (PIC) package, comprising a first die comprising a first optical waveguide and a first trench extending from a first edge of the first die to the first optical waveguide, wherein the first trench is aligned with the first optical waveguide, a second die comprising a second optical waveguide and a second trench extending from a second edge of the second die to the second optical waveguide, wherein the second trench is aligned with the second optical waveguide; and an optical wire comprising a glass fiber, the optical wire comprising a first terminal portion extending within the first trench and a second terminal portion extending within the second trench, wherein the first terminal portion is aligned with the first optical waveguide and the second terminal portion is aligned with the second optical waveguide, wherein the first die and the second die are electrically coupled to a package substrate comprising electrical routing within a dielectric, and wherein the electrical routing comprises power and signal routing coupled to a first optoelectronic component on the first die and coupled to the first optical waveguide, and to a second optoelectronic component on the second die and coupled to the second optical waveguide, and wherein the package substrate is electrically coupled to a power and signal routing within a printed circuit board.

Example 13 includes all of the features of example 12, further comprising a third die, wherein the third die comprises a third trench extending from a third edge of the third die to a third optical waveguide, and wherein the third trench is aligned with the third optical waveguide, and wherein the optical wire is a first optical wire, and a second optical wire extends between a fourth waveguide on the second die and the third waveguide on the third die, wherein the second optical wire is aligned with the third optical waveguide and the fourth optical waveguide.

Example 14 includes all of the features of examples 12 or 13, wherein the fourth die comprises a fourth trench extending from a fourth edge of the fourth die to a fifth optical waveguide, wherein the fourth trench is aligned with a fifth optical waveguide; and wherein the second die comprises a sixth optical waveguide, and a third optical wire extends between the fifth optical waveguide and the sixth optical waveguide.

Example 15 is a method for making a photonic integrated circuit (PIC) package, comprising receiving a first integrated circuit (IC) die and a second IC die electrically coupled to an IC package substrate, wherein the first IC die comprises a first optical waveguide and a first trench extending from a first edge of the first IC die to the first optical waveguide, and the second IC die comprises a second optical waveguide and a second trench extending from a second edge of the second IC die to the second optical waveguide, attaching a first terminal portion of a glass fiber within the first trench and aligning a first terminal of the glass fiber with the first optical waveguide, and attaching a second terminal portion of the glass fiber within the second trench and aligning a second terminal of the glass fiber with the second optical waveguide.

Example 16 includes all of the features of example 15, wherein attaching the second terminal portion of the glass fiber into the second trench comprises drawing the glass fiber to extend to the second IC die, immobilizing the glass fiber and cleaving the glass fiber to produce the second terminal.

Example 17 includes all of the features of examples 15 or 16, wherein immobilizing the glass fiber comprises grasping the glass fiber with a manipulating tool comprising clamping jaws or a press.

Example 18 includes all of the features of examples 16 or 17, wherein immobilizing the glass fiber comprises holding the glass fiber with a vacuum chuck, and pressing the second terminal portion of the glass fiber into the trench with a press.

Example 19 includes all of the features of any one of examples 15 through 18, wherein attaching the first terminal portion of the glass fiber into the first trench comprises dispensing a first bead of adhesive into the first trench; and wherein attaching the second terminal portion of the glass fiber into the second trench comprises dispensing a second bead of adhesive into the second trench.

Example 20 includes all of the features of any one of examples 15 through 19, wherein attaching the first terminal portion of the glass fiber into the first trench comprises placing the first terminal portion of the glass fiber over a first terminal portion the first optical waveguide; and wherein attaching the second terminal portion of the glass fiber into the second trench comprises placing the second terminal portion of the glass fiber over a second terminal portion of the second optical waveguide.

We claim:

1. A photonic integrated circuit (PIC) package, comprising:
   a first die comprising a first optical waveguide, and a first trench extending from a first edge of the first die to the first optical waveguide, wherein the first trench is aligned with the first optical waveguide;
   a second die comprising a second optical waveguide, and a second trench extending from a second edge of the second die to the second optical waveguide, wherein the second trench is aligned with the second optical waveguide; and
   an optical wire comprising a glass fiber, the optical wire comprising a first terminal portion extending within the first trench and a second terminal portion extending within the second trench, wherein the first terminal portion is aligned with the first optical waveguide and the second terminal portion is aligned with the second optical waveguide.

2. The PIC package of claim 1, wherein the optical wire is one of a plurality of optical wires, individual optical wires extending between first terminal portions of first individual optical waveguides of the first die and second terminal portions of second individual waveguides of the second die, the PIC package further comprising an encapsulate material surrounding at least portions of plurality of optical wires between the first die and the second die.

3. The PIC package of claim 1, wherein the first and second trenches have a first depth and a second depth, respectively, that range between 10% and 100% of an average diameter of the glass fiber, and a first width and a second width, respectively, that range between 50% and 100% of the average diameter of the glass fiber.

4. The PIC package of claim 1, wherein the first terminal portion of the optical wire has a first end that is abutted against a first terminal sidewall of the first optical waveguide, and the second terminal portion of the optical wire has a second end that is abutted against a second terminal sidewall of the second optical waveguide.

5. The PIC package of claim 1, wherein the first optical waveguide is below a surface of the first die and has a buried sidewall adjacent to the surface, the first trench extending along the surface over the buried sidewall, the first terminal portion of the optical wire extending within the first trench and overlaps a portion of the buried sidewall.

6. The PIC package of claim 1, wherein the first terminal portion and the second terminal portion of the optical wire are bonded to the first die and the second die, respectively, by an encapsulant comprising a polymeric material, the encapsulant having an adhesive bond between the first terminal portion of the glass fiber and the first trench and between the second terminal portion of the glass fiber and the second trench, respectively.

7. The PIC package of claim 6, wherein the polymeric material has a first refractive index that is substantially the same as a second refractive index of at least the first optical waveguide.

8. The PIC package of claim 1, wherein the optical wire has a coating comprising an adhesive polymeric material, wherein a first layer comprising the adhesive polymeric material is between the first terminal portion of the optical wire and the first trench, and a second layer comprising the adhesive polymeric material is between the second terminal portion of the optical wire and the second trench.

9. The PIC package of claim 1, wherein the optical wire comprises any of silicon, oxygen, boron, calcium or aluminum, and wherein at least a portion of the silicon, oxygen, boron calcium or aluminum are combined as calcium alumino-borosilicate or calcium aluminosilicate glass.

10. The PIC package of claim 1, wherein the glass fiber has an average diameter ranging between 5 microns and 30 microns.

11. The PIC package of claim 1, wherein the first trench and second trench have a width ranging between 3 microns and 10 microns, and a depth ranging between 1.5 microns and 10 microns.

12. A photonic integrated circuit (PIC) package, comprising:
a first die comprising a first optical waveguide and a first trench extending from a first edge of the first die to the first optical waveguide, wherein the first trench is aligned with the first optical waveguide;
a second die comprising a second optical waveguide and a second trench extending from a second edge of the second die to the second optical waveguide, wherein the second trench is aligned with the second optical waveguide; and
an optical wire comprising a glass fiber, the optical wire comprising a first terminal portion extending within the first trench and a second terminal portion extending within the second trench, wherein the first terminal portion is aligned with the first optical waveguide and the second terminal portion is aligned with the second optical waveguide,
wherein the first die and the second die are electrically coupled to a package substrate comprising electrical routing within a dielectric, and wherein the electrical routing comprises power and signal routing coupled to a first optoelectronic component on the first die and coupled to the first optical waveguide, and coupled to a second optoelectronic component on the second die and coupled to the second optical waveguide, and wherein the package substrate is electrically coupled to a power and signal routing within a printed circuit board.

13. The PIC package of claim 12, further comprising a third die, wherein:
the third die comprises a third trench extending from a third edge of the third die to a third optical waveguide, and wherein the third trench is aligned with the third optical waveguide; and
the optical wire is a first optical wire, and a second optical wire extends between a fourth optical waveguide on the second die and the third optical waveguide on the third die, wherein the second optical wire is aligned with the third optical waveguide and the fourth optical waveguide.

14. The PIC package of claim 13, further comprising a fourth die, wherein:
the fourth die comprises a fourth trench extending from a fourth edge of the fourth die to a fifth optical waveguide, wherein the fourth trench is aligned with fifth optical waveguide; and
the second die comprises a sixth optical waveguide, and a third optical wire extends between the fifth optical waveguide and the sixth optical waveguide.

* * * * *